(12) United States Patent
Kanous et al.

(10) Patent No.: US 9,603,407 B2
(45) Date of Patent: Mar. 28, 2017

(54) INTERDIGITATED CELLULAR CUSHIONING

(71) Applicant: SKYDEX Technologies, Inc., Centennial, CO (US)

(72) Inventors: Trevor Kanous, Lakewood, CO (US); Peter M. Foley, Castle Rock, CO (US); Collin Metzer, Highands Ranch, CO (US); Eric W. Sugano, Denver, CO (US); Gerald M. Buchen, Parker, CO (US); Mark Massman, Centennial, CO (US); Jon Neal, Centennial, CO (US)

(73) Assignee: Skydex Technologies, Inc., Centennial, CO (US)

( * ) Notice: Subject to any disclaimer, the term of this patent is extended or adjusted under 35 U.S.C. 154(b) by 0 days.

(21) Appl. No.: 14/543,798

(22) Filed: Nov. 17, 2014

(65) Prior Publication Data

US 2015/0075931 A1 Mar. 19, 2015

Related U.S. Application Data

(63) Continuation of application No. 13/323,611, filed on Dec. 12, 2011, now Pat. No. 8,915,339.
(Continued)

(51) Int. Cl.
*F16F 7/12* (2006.01)
*A42B 3/12* (2006.01)
(Continued)

(52) U.S. Cl.
CPC ............ *A42B 3/124* (2013.01); *A47C 27/081* (2013.01); *A47C 27/18* (2013.01); *B32B 3/28* (2013.01);
(Continued)

(58) Field of Classification Search
CPC .... F16F 7/12; F16F 7/121; F16F 7/122; F16F 7/124; A42B 3/124; A42B 3/125; A42B 3/128; A41D 13/0156; B32B 3/28
(Continued)

(56) References Cited

U.S. PATENT DOCUMENTS

| 40,422 A | 10/1863 | Miles |
| 2,809,908 A | 10/1957 | French |

(Continued)

FOREIGN PATENT DOCUMENTS

| CA | 2162053 A1 | 12/2003 |
| CN | 2566721 Y | 8/2003 |

(Continued)

OTHER PUBLICATIONS

EPO machine translation WO 2005/050053 A1, Jun. 2005.*
(Continued)

*Primary Examiner* — Thomas J Williams
(74) *Attorney, Agent, or Firm* — Holzer Patel Drennan

(57) ABSTRACT

An interdigitated cellular cushioning system includes an array of void cells protruding from each of two binding layers interdigitated between the two binding layers. Peaks of each of the void cells are attached to the opposite binding layer forming the interdigitated cellular cushioning system. The interdigitated cellular cushioning system may be used to absorb and distribute a source of kinetic energy incident on the interdigitated cellular cushioning system (e.g., an impact or explosion) so that the amount of force transmitted through the interdigitated cellular cushioning system is low enough that it does not cause injury to personnel or damage to personnel and/or equipment adjacent the interdigitated cellular cushioning system.

17 Claims, 15 Drawing Sheets

Related U.S. Application Data

(60) Provisional application No. 61/421,713, filed on Dec. 10, 2010.

(51) Int. Cl.
  *A47C 27/18* (2006.01)
  *A47C 27/08* (2006.01)
  *B32B 3/28* (2006.01)
  *A41D 13/015* (2006.01)

(52) U.S. Cl.
  CPC .......... *F16F 7/121* (2013.01); *A41D 13/0156* (2013.01); *Y10T 428/24661* (2015.01); *Y10T 428/24702* (2015.01)

(58) Field of Classification Search
  USPC ......... 188/371, 372, 377; 267/145, 146, 153
  See application file for complete search history.

(56) References Cited

U.S. PATENT DOCUMENTS

| | | | |
|---|---|---|---|
| 3,039,109 A | 6/1962 | Simpson | |
| 3,086,899 A | 4/1963 | Ingraham et al. | |
| 3,444,034 A | 5/1969 | Hewett | |
| 3,609,764 A | 10/1971 | Morgan | |
| 3,713,640 A | 1/1973 | Margan | |
| 3,761,959 A | 10/1973 | Dunning | |
| 3,843,970 A | 10/1974 | Marietta et al. | |
| 4,023,213 A | 5/1977 | Rovani | |
| 4,239,106 A | 12/1980 | Aileo | |
| 4,307,471 A | 12/1981 | Lovell | |
| 4,345,338 A | 8/1982 | Frieder et al. | |
| 4,432,099 A | 2/1984 | Grick et al. | |
| 4,472,472 A | 9/1984 | Schultz | |
| 4,477,929 A | 10/1984 | Mattsson | |
| 4,495,237 A * | 1/1985 | Patterson | 428/178 |
| 4,535,553 A | 8/1985 | Derderian et al. | |
| 4,558,470 A | 12/1985 | Mitchell et al. | |
| 4,566,137 A | 1/1986 | Gooding | |
| 4,586,200 A | 5/1986 | Poon | |
| 4,614,000 A | 9/1986 | Mayer | |
| 4,619,055 A | 10/1986 | Davidson | |
| 4,627,114 A | 12/1986 | Mitchell | |
| 4,631,221 A | 12/1986 | Disselbeck et al. | |
| 4,677,694 A | 7/1987 | Crow | |
| 4,724,549 A | 2/1988 | Herder et al. | |
| 4,831,668 A | 5/1989 | Schultz | |
| 4,837,866 A | 6/1989 | Rector et al. | |
| 4,853,980 A | 8/1989 | Zarotti | |
| 4,916,759 A | 4/1990 | Arai | |
| 5,030,501 A | 7/1991 | Colvin et al. | |
| 5,035,009 A | 7/1991 | Wingo et al. | |
| 5,168,576 A | 12/1992 | Krent et al. | |
| 5,251,742 A * | 10/1993 | Campbell | 267/153 |
| 5,254,039 A | 10/1993 | Garcia | |
| 5,390,467 A | 2/1995 | Shuert | |
| 5,390,580 A | 2/1995 | Gibbons et al. | |
| 5,470,641 A * | 11/1995 | Shuert | 428/178 |
| 5,518,802 A | 5/1996 | Colvin et al. | |
| 5,572,804 A | 11/1996 | Skaja et al. | |
| 5,586,348 A | 12/1996 | Toivio et al. | |
| 5,596,781 A | 1/1997 | Graebe | |
| 5,599,606 A | 2/1997 | Disselbeck et al. | |
| 5,617,595 A | 4/1997 | Landi | |
| 5,638,565 A | 6/1997 | Pekar | |
| 5,701,621 A | 12/1997 | Landi et al. | |
| 5,894,045 A * | 4/1999 | Desrondiers | 428/178 |
| 5,953,761 A | 9/1999 | Jurga et al. | |
| 5,976,451 A | 11/1999 | Skaja et al. | |
| 6,029,962 A | 2/2000 | Shorten et al. | |
| 6,098,313 A | 8/2000 | Skaja | |
| 6,128,786 A | 10/2000 | Maddux et al. | |
| 6,138,284 A | 10/2000 | Arai | |
| 6,174,587 B1 | 1/2001 | Figge | |
| 6,189,168 B1 | 2/2001 | Graebe | |
| 6,269,504 B1 | 8/2001 | Romano | |
| 6,272,692 B1 | 8/2001 | Abraham | |
| 6,353,953 B1 | 3/2002 | Tanaka et al. | |
| 6,386,109 B1 | 5/2002 | Brooks et al. | |
| 6,399,189 B1 | 6/2002 | Kobayashi et al. | |
| 6,598,251 B2 | 7/2003 | Habboub et al. | |
| 6,637,735 B2 | 10/2003 | Monson et al. | |
| 6,713,008 B1 | 3/2004 | Teeter | |
| D492,818 S | 7/2004 | Ide et al. | |
| 6,777,062 B2 | 8/2004 | Skaja | |
| 6,901,617 B2 | 6/2005 | Sprouse, II et al. | |
| 6,934,971 B2 | 8/2005 | Ide et al. | |
| 6,938,290 B2 | 9/2005 | McKinney et al. | |
| 6,953,105 B2 | 10/2005 | Rust et al. | |
| 7,021,017 B2 | 4/2006 | Herron | |
| 7,033,666 B2 | 4/2006 | Skaja | |
| 7,048,879 B2 | 5/2006 | Kobayashi et al. | |
| 7,574,760 B2 | 8/2009 | Foley et al. | |
| 7,591,114 B2 | 9/2009 | Herron | |
| 7,673,351 B2 | 3/2010 | Copeland et al. | |
| 7,740,321 B2 | 6/2010 | Brill et al. | |
| 8,069,498 B2 | 12/2011 | Maddux et al. | |
| 8,402,715 B2 * | 3/2013 | Uhllg et al. | 52/783.11 |
| 2002/0028318 A1 | 3/2002 | Clark | |
| 2003/0110565 A1 | 6/2003 | Grabe | |
| 2003/0205920 A1 | 11/2003 | Sprouse, II et al. | |
| 2004/0025231 A1 | 2/2004 | Ide et al. | |
| 2004/0171321 A1 | 9/2004 | Plant | |
| 2006/0143807 A1 | 7/2006 | Udelhofen et al. | |
| 2006/0177635 A1 * | 8/2006 | Pepe et al. | 428/174 |
| 2006/0277685 A1 | 12/2006 | Foley et al. | |
| 2007/0187961 A1 * | 8/2007 | Audi et al. | 293/134 |
| 2008/0282876 A1 | 11/2008 | Leivesley et al. | |
| 2009/0106882 A1 | 4/2009 | Nimmons et al. | |
| 2010/0176633 A1 | 7/2010 | Brncick et al. | |
| 2010/0299812 A1 | 12/2010 | Maddux et al. | |
| 2011/0221235 A1 * | 9/2011 | Tauchi et al. | 296/187.05 |
| 2011/0271430 A1 | 11/2011 | Lowe et al. | |
| 2011/0283876 A1 | 11/2011 | Foley et al. | |
| 2012/0017358 A1 | 1/2012 | Princip et al. | |

FOREIGN PATENT DOCUMENTS

| | | |
|---|---|---|
| CN | ZL94192458.0 | 10/2003 |
| CN | 1615771 A | 5/2005 |
| CN | 101133915 A | 3/2008 |
| CN | 210509969 U | 6/2010 |
| DE | 2035449 A1 | 1/1972 |
| DE | 10136898 A1 * | 2/2003 |
| EP | 916277 B1 | 12/1998 |
| EP | 605485 B1 | 6/1999 |
| EP | 697825 B1 | 8/2001 |
| EP | 3020309 A1 | 5/2016 |
| FR | 1047151 | 12/1953 |
| FR | 1245009 A | 11/1960 |
| FR | 2442050 A1 | 6/1980 |
| GB | 2207730 A * | 2/1989 |
| HK | 1035224 A1 | 5/2004 |
| JP | 07-243796 A | 9/1995 |
| JP | H07237272 A | 9/1995 |
| JP | 3471011 B | 9/2003 |
| JP | 06-194490 A | 7/2006 |
| JP | 3887705 B | 12/2006 |
| JP | 2008-284169 A | 11/2008 |
| JP | 2011501800 A | 1/2011 |
| KR | 224293 B1 | 7/1999 |
| KR | 329882 B1 | 3/2002 |
| KR | 329883 B1 | 3/2002 |
| RU | 2329751 C2 | 7/2008 |
| SU | 1131985 A * | 12/1984 |
| TW | NI-59815 | 4/1993 |
| WO | 95-22922 A1 | 8/1995 |
| WO | 9922160 A1 | 5/1999 |
| WO | 00-33015 A2 | 6/2000 |
| WO | 02099218 A1 | 12/2002 |
| WO | WO 2005050053 A1 * | 6/2005 |
| WO | 2006125969 A1 | 11/2006 |
| WO | 2009-075922 A1 | 6/2009 |

(56) References Cited

FOREIGN PATENT DOCUMENTS

OTHER PUBLICATIONS

International Searching Authority, International Search Report, PCT/US2011/037586, dated Feb. 9, 2012, 3 pages.
International Searching Authority, Written Opinion of the International Searching Authority, PCT/US2011/037586, dated Feb. 9, 2012, 3 pages.
International Searching Authority, International Search Report, PCT/US2011/064449, dated Jul. 24, 2012, 5 pages.
International Searching Authority, Written Opinion, PCT/US2011/064449, dated Jul. 24, 2012, 4 pages.
International Searching Authority, International Search Report, PCT/US2012/041306, dated Dec. 27, 2012, 5 pages.
International Searching Authority, Written Opinion, PCT/US2011/041306, dated Dec. 27, 2012, 6 pages.
International Searching Authority, U.S. Patent and Trademark Office, International Preliminary Search Report and Written Opinion for PCT/US2011/064449, dated Jun. 12, 2013, 5 pages.
U.S. Appl. No. 30/660,259, Nov. 27, 1962, Adie.
European Patent Office, Extended European Search Report, Mar. 21, 2016, 7 pages.

* cited by examiner

INTERDIGITATED CELLULAR CUSHIONING

CROSS-REFERENCE TO RELATED APPLICATIONS

The present application is a continuation of U.S. patent application Ser. No. 13/323,611 filed Dec. 12, 2011, (now allowed) which claims benefit of priority to U.S. Provisional Patent Application No. 61/421,713, entitled "Interdigitated Cellular Cushioning" and filed on Dec. 10, 2010, which are specifically incorporated by reference herein for all that they disclose or teach. The present application is further related to International Patent Application No. PCT/US11/64449, published as WO 2012/079082 and entitled "Interdigitated Cellular Cushioning," and filed under the Patent Cooperation Treaty on Dec. 12, 2011, which is also specifically incorporated by reference herein for all that it discloses or teaches.

BACKGROUND

Cushioning systems are used in a wide variety of applications including comfort and impact protection of the human body. A cushioning system is placed adjacent a portion of the body (with one or more layers of material between the body and the cushioning system, in some implementations) and provides a barrier between the body and one or more objects impinging on the body. For example, a foam floor mat contains multiple voids filled with air that cushion the body from a hard floor surface. Similarly, chairs, gloves, knee-pads, helmets, etc. may include a cushioning system that provides a barrier between a portion of the body and one or more objects impinging on that portion of the body.

A variety of structures are used for cushioning systems. For example, an array of closed-cell air chambers often constitutes various impact protection padding (e.g., pads and helmets). Further examples include open or closed cell foam and elastomeric honeycomb structures. These structures may break down over time and often lack a controlled spring rate or rates over the entire deformation range of the structures.

SUMMARY

Implementations described and claimed herein address the foregoing problems by providing an interdigitated cellular cushioning system comprising a first sheet of resilient material including a first binding layer and a first array of void cells protruding from the first binding layer; and a second sheet of resilient material including a second binding layer and a second array of void cells protruding from the second binding layer, wherein the void cells are configured to monotonically collapse under a load, wherein a peak of each void cell in the first array contacts the second binding layer and a peak of each void cell in the second array contacts the first binding layer, and wherein at least one void cell in the first array is attached to the second binding layer and at least one void cell in the second array is attached to the first binding layer.

Further implementations described and claimed herein address the foregoing problems by providing a method of absorbing kinetic energy comprising monotonically collapsing a first sheet of resilient material including a first binding layer and a first array of void cells protruding from the first binding layer and monotonically collapsing a second array of void cells protruding from a second binding layer of a second sheet of resilient material without collapsing the second binding layer, wherein a peak of each void cell in the first array contacts the second binding layer and a peak of each void cell in the second array contacts the first binding layer, and wherein at least one void cell in the first array is attached to the second binding layer and at least one void cell in the second array is attached to the first binding layer.

Still further implementations described and claimed herein address the foregoing problems by providing a method of manufacturing an interdigitated cellular cushioning system comprising molding a first sheet of resilient material into a first binding layer with a first array of void cells protruding from the first binding layer; molding a second sheet of resilient material into a second binding layer with a second array of void cells protruding from the second binding layer; molding a third sheet of resilient material into a third binding layer with a third array of void cells protruding from the third binding layer; molding a fourth sheet of resilient material into a fourth binding layer with a fourth array of void cells protruding from the fourth binding layer; and welding a peak of a void cell in the first array to the second binding layer, the third binding layer, and a peak of a void cell in the fourth array.

Other implementations are also described and recited herein.

BRIEF DESCRIPTIONS OF THE DRAWINGS

DETAILED DESCRIPTIONS

Figure 1:
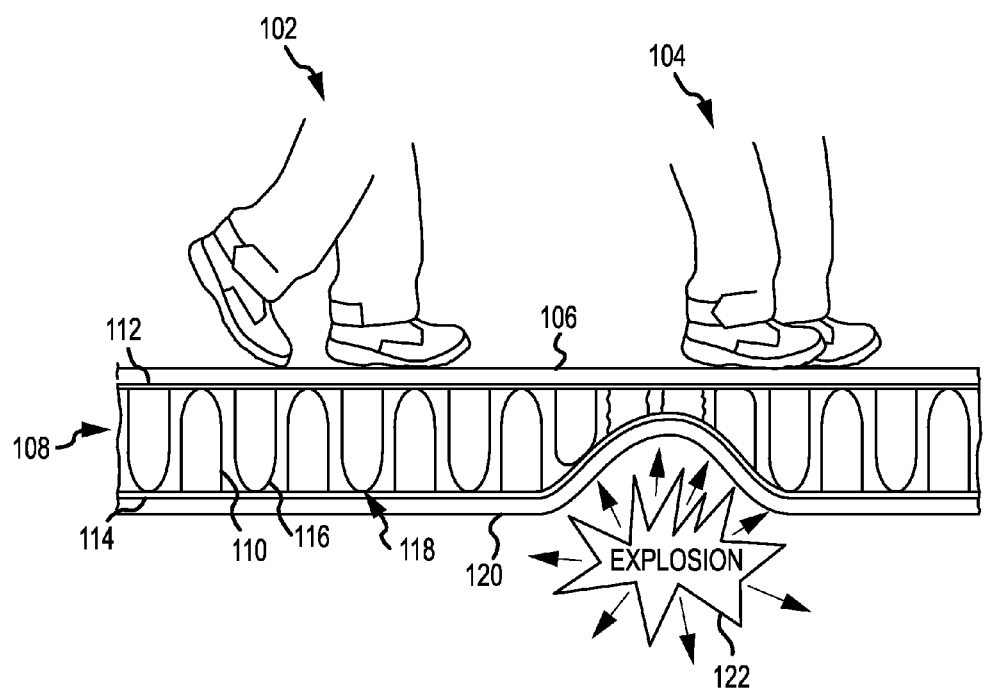
FIG. 1 illustrates two users standing on a surface incorporating an example interdigitated cellular cushioning system.

FIG. 1 illustrates two users 102, 104 standing on a floor 106 incorporating an example interdigitated cellular cushioning system 108. The floor 106 is the traction or standing surface of a vehicle, building, or other structure, for example. Attached to a bottom surface of the floor 106 is the cushioning system 108. In some implementations, a top binding layer 112 of the cushioning system 108 may serve as the floor 106. In other implementations, the cushioning system 108 is utilized under the floor 106. Below the cushioning system 108 is a protective or load distributing layer 120 that is attached to a bottom binding layer 114 of the cushioning system 108. In one implementation, the protective layer 120 is armor to protect the users 102, 104 from incoming projectiles. In other implementation, the protective layer 120 is merely another layer of the floor. In some implementations, the protective layer 120 is not included.

The cushioning system 108 includes void cells (e.g., void cells 110, 116) or support units arranged in a matrix bounded by the top binding layer 112 and the bottom binding layer 114. The cells alternate facing upwards and downward. In one implementation, each upward facing cell (e.g., cell 116) is surrounded by downward facing cells and each downward facing cell (e.g., cell 110) is surrounded by upward facing cells. The void cells are hollow chambers that resist deflection due to compressive forces, similar to compression springs. In one implementation, each upward facing cell is a protrusion of the top binding layer 112 and each downward facing cell is a protrusion of the bottom binding layer 114. Each peak (e.g., peak 118) of the upward facing cells is attached to the bottom binding layer 114. Similarly, each peak of the downward facing cells is attached to the top binding layer 112. The binding layers 112, 114 link the void cells together forming the interdigitated cellular cushioning system 108.

In the event of an explosion (e.g., explosion 122), or other large impulse of kinetic energy (e.g., a physical impact), the protective layer 120 may buckle as shown or may also be punctured or ruptured. Upward deflection of the protective layer 120 is absorbed by the cushioning system 108. Cells adjacent the explosion 122 are compressed in various states to ensure that minimal energy is transmitted through the floor 106 to the users 102, 104. In some implementations with particularly large explosions or impacts, the floor 106 may be affected some, but to a lesser extent than the protective layer 120. The end result is that much of the upward movement of the protective layer and the energy created by the explosion 122 are largely absorbed by the cushioning system 108 and injury to the users 102, 104 is reduced or prevented because the floor 106 is relatively unaffected.

In a further application, the cushioning system 108 may be used to change a path of an incoming projectile. Changing the path of a pointed projectile, such as a bullet, can reduce the projectile's effectiveness at penetrating a surface. For example, if a bullet penetrates the protective layer 120 and proceeds into the cushioning system 108, the cushioning system 108 may not significantly reduce the kinetic energy of the bullet as the bullet passes through the cushioning system 108. However, the varying structures (e.g., the void cells) in the cushioning system 108 may cause the bullet to turn or start to tumble. As a result, the bullet's effectiveness at penetrating the floor 106 is reduced and the users 102, 104 are better protected.

Figure 2:
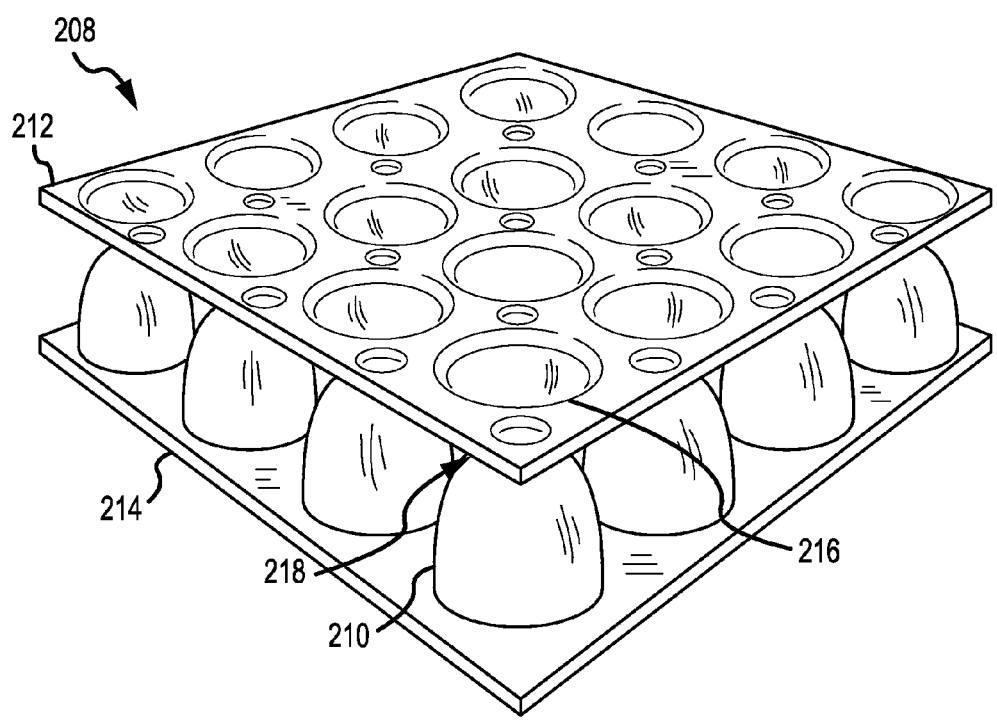
FIG. 2 illustrates a perspective view of an example interdigitated cellular cushioning system.

FIG. 2 illustrates a perspective view of an example interdigitated cellular cushioning system 208. The cushioning system 208 includes void cells (e.g., void cell 210) arranged in a matrix bounded by the top binding layer 212 and a bottom binding layer 214. The cells alternate facing upwards and downward. In one implementation, each upward facing cell inward from the edges of the cushioning system 208 panel (e.g., cell 216) is surrounded on all four sides by downward facing cells and each downward facing cell inward from the edges of the cushioning system 208 panel are similarly surrounded on all four sides by upward facing cells. Void cells on the edge of the system panel (e.g., cell 210) are surrounded by upward facing cells on less than four sides (e.g., cell 210 is surrounded on three sides). Interdigitation of the void cells may aid the cushioning system 208 in resisting non-normal loads, at least when compared to other materials incorporating energy-absorbing geometry. More specifically, shear forces along the top and bottom binding layers 212, 214 may not significantly impact the energy absorbing capability of the cushioning system 208 due at least in part to the interdigitation of the void cells.

The void cells are hollow chambers that resist deflection due to compressive forces, similar to compression springs. The force-deflection profile or spring rate profile (i.e., compressive force required per unit of compressive displacement) of the matrix of void cells is configurable based on the intended application of the cushioning system 208. Further, the spring rates of the void cells in combination with overall cushioning system 212 thickness can provide a desired energy absorption for an expected range of kinetic energies that may be applied to the cushioning system 212.

At least a choice of material, wall thickness, size, spacing, and shape of each of the void cells defines the resistive force each of the void cells can apply. Materials used for the void cells are generally elastically deformable under expected load conditions and will withstand numerous deformations without fracturing. Example materials include engineering grade plastic elastomers (e.g., thermoplastic urethane, Dow Pellethane®, and Lubrizol Estane®), styrene copolymers, metallocenes, thermoplastic polyester elastomers (e.g., Dupont™ Hytrel®), ethylene-vinyl acetate, thermoplastic vulcanisate, and rubber. Further, the wall thickness of each of the void cells may range from 0.005 to 0.1 inches. In some implementations, the wall thickness of each void cell varies over a height of the void cell (e.g., the void cells may each be thinner at the base and thicker at the peak). This phenomenon may be a by-product of the manufacturing process or may be intentionally designed into the manufacturing process. Still further, the size of each of the void cells may range from 0.2 to 3 inches in diameter and height.

Further yet, the void cells may be cubical, pyramidal, hemispherical, hemiellipsoidal, conical, truncated conical, or any other shape capable of having a hollow interior volume. Still further, the void cells may be characterized as columns or tapered columns. Still further, the void cells may be spaced a variety of distances from one another. For example, a more tightly spaced matrix of void cells will likely result in a greater energy absorption value than a more loosely spaced matrix of void cells. An example spacing range is nearly zero (or touching) to 3 inches or more between void cells. Further, the aforementioned features of the void cells may not be uniform throughout the cushioning system 208. For example, features of each of the void cells attached to the top binding layer may vary from features of each of the void cells attached to the bottom binding layer. The features of the void cells, whether they are uniform across the cushioning system or not, are designed to yield a desired spring rate profile (see e.g., FIG. 11). The aforementioned dimensions are examples only; the cushioning system 208 may utilize dimensions outside of the given ranges.

In one implementation, each upward facing cell is a protrusion of the top binding layer 212 and each downward facing cell is a protrusion of the bottom binding layer 214. Each peak of the upward facing cells is attached to the bottom binding layer 214. Similarly, each peak (e.g., peak 218) of the downward facing cells is attached to the top binding layer 212. The binding layers 212, 214 link the void cells together forming the interdigitated cellular cushioning system 208. In other implementations, the upward and downward facing cells are not protrusions of the top and bottom binding layers 212, 214. Instead, the upward and downward facing cells are merely attached to the top and bottom binding layers 212, 214. The top and bottom binding layers 212, 214 may be constructed with the same potential materials as the void cells and in one implementation are contiguous with each of the void cells. One or more coupling ribs (not shown) may be attached to the exterior of the void cells extending vertically to the top and/or bottom binding layers 212, 214. These ribs can add additional stiffness to the void cells.

The void cells are filled with ambient air, a foam, or a fluid other than air, for example. The foam or certain fluids may be used to add insulation or additional resistance to deformation to the cushioning system 208. In a vacuum environment, the void cells may be un-filled. By not relying on air pressure for resistance to deflection, the void cells can achieve a controlled spring rate that is not necessarily linear (e.g., as with a traditional coil spring), or exponentially increasing (e.g., as with a closed chamber of air with non-elastic walls). Air and/or water could be forced through voids between the upward and downward facing cells to facilitate cleaning substantially all of the surfaces of the components of the cushioning system 208. Further, these surfaces of the cushioning system 208 could be treated with an anti-microbial substance or the cushioning system 208 material itself could be anti-microbial.

The cushioning system 208 may be manufactured using a variety of manufacturing processes (e.g., blow molding, forming extrusion, injection molding, reaction injection molding (RIM), vacuum forming, laminating, etc.). In one implementation, the cushioning system 208 is manufactured in two halves. A first half comprises the top binding layer 212 with void cells protruding therefrom. A second half comprises the bottom binding layer 214, also with void cells protruding therefrom. The two halves are then placed adjacent one another with void cells from the top binding layer 212 protruding toward the bottom binding layer 214 and vice versa. The void cells from the top binding layer 212 alternate with the void cells from the bottom binding layer 214. Peaks or tops (e.g., peak 218) of each of the void cells in the top binding layer 212 are then laminated or glued to the bottom binding layer 214, and vice versa. In one implementation, the top binding layer 212 and the bottom binding layer 214 are not required to be precisely aligned because the interdigitated void cells naturally find a position between one another when positioned together for the welding or gluing process. As a result, manufacturing costs may be reduced. Further, multiple weld points between the top binding layer 212 and the bottom binding layer 214 makes a very strong bond between the layers 212, 214. In another implementation, the cushioning system 208 is manufactured in one piece rather than two pieces as discussed above. Further, a cushioning system according to the presently disclosed technology may include two or more matrices of interdigitated void cells (i.e., two or more cushioning systems 208) stacked on top of one another.

Figure 3:
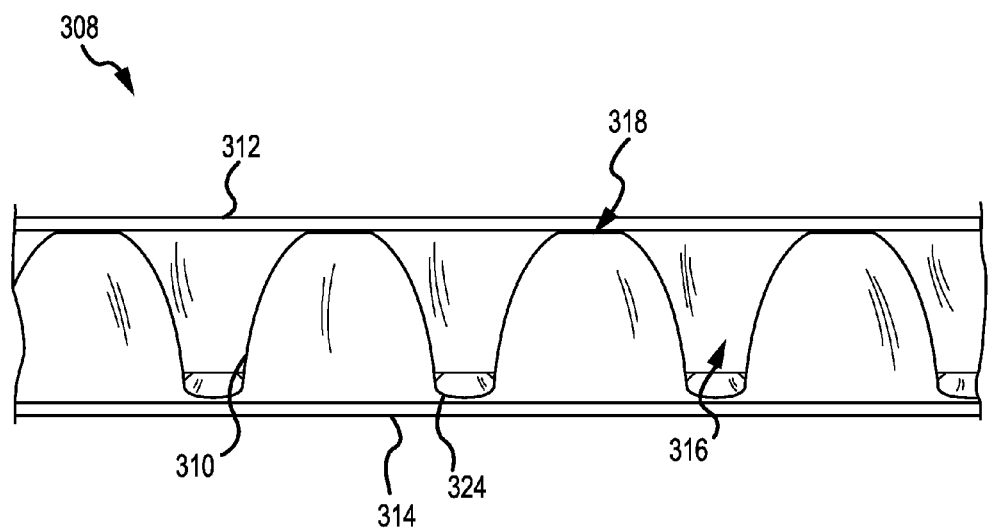
FIG. 3 illustrates an elevation view of an example interdigitated cellular cushioning system.

FIG. 3 illustrates an elevation view of an example interdigitated cellular cushioning system 308. The cushioning system 308 includes void cells (e.g., void cell 310) arranged in a matrix bounded by a top binding layer 312 and a bottom binding layer 314. The cells alternate facing upwards and downward. In one implementation, each upward facing cell (e.g., cell 316) is surrounded by downward facing cells and each downward facing cell (e.g., cell 310) is surrounded by upward facing cells. The void cells are hollow chambers that resist deflection due to compressive forces, similar to compression springs. The force-deflection profile of the matrix of void cells is configurable based on the intended application of the cushioning system 308.

Each upward facing cell is a protrusion of the top binding layer 312 and each downward facing cell is a protrusion of the bottom binding layer 314. Each peak (e.g., peak 318) of the upward facing cells is attached to the bottom binding layer 314. Similarly, each peak of the downward facing cells is attached to the top binding layer 312. The binding layers 312, 314 link the void cells together forming the interdigitated cellular cushioning system 308. In other implementations, the upward and downward facing cells are not protrusions of the top and bottom binding layers 312, 314. Instead, the upward and downward facing cells are merely attached to the top and bottom binding layers 312, 314. One or more coupling ribs 324 may be attached to the exterior of the void cells extending vertically to the top and/or bottom binding layers 312, 314. These ribs can add additional stiffness to the void cells.

Figure 4:
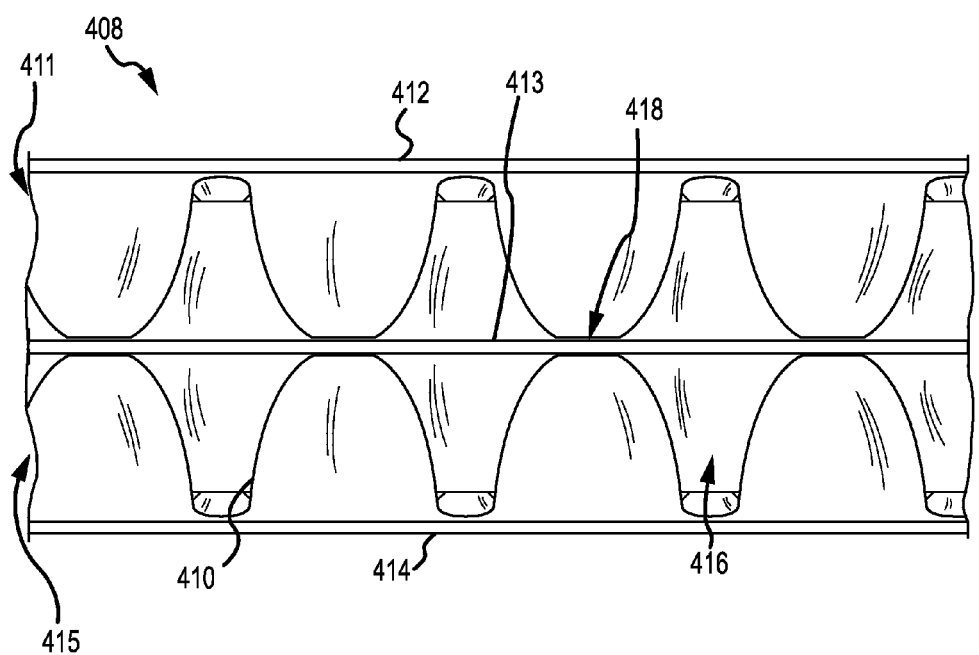
FIG. 4 illustrates an elevation view of an example 2-layer interdigitated cellular cushioning system.

FIG. 4 illustrates an elevation view of an example 2-layer interdigitated cellular cushioning system 408. The cushioning system 408 includes two layers 411, 415 of void cells (e.g., void cell 416). Each layer 411, 415 is arranged in a matrix bounded by two binding layers. The top layer 411 is arranged in a matrix bounded by a top binding layer 412 and a middle binding layer 413. The bottom layer 415 is arranged in a matrix bounded by the middle binding layer 413 and a bottom binding layer 414.

The cells in each layer 411, 415 alternate facing upwards and downward. In one implementation, each upward facing cell (e.g., cell 416), excepting cells on the edge or corner of the cushioning system 408, is surrounded on four sides by downward facing cells and each downward facing cell (e.g., cell 410), excepting cells on the edge or corner of the cushioning system 408, is surrounded on four sides by upward facing cells. Further each peak (e.g., peak 418) of the top layer 411 may be aligned with each peak of the bottom layer 415. Similarly, each hollow chamber of each void cell in the top layer 411 may be aligned with each hollow chamber of each void cell in the bottom layer 415. The void cells are hollow chambers that resist deflection due to compressive forces, similar to compression springs. The force-deflection profile of the matrix of void cells is configurable based on the intended application of the cushioning system 408.

The upward facing cells are protrusions of the middle binding layer 413 or the top binding layer 412. Similarly, the downward facing cells are protrusions of the middle binding layer 413 or the bottom binding layer 414. The peaks of the upward facing cells are attached to the middle binding layer 413 or the bottom binding layer 414. Similarly, the peaks of the downward facing cells are attached to the middle binding layer 413 or the top binding layer 412. In some implementations, the middle binding layer 413 includes two sub-layers, one sub-layer associated with the top layer 411 and one sub-layer associated with the bottom layer 415. The binding layers 412, 413, 414 link the void cells together forming the interdigitated cellular cushioning system 408. In other implementations, the upward and downward facing cells are not protrusions of the binding layers 412, 413, 414. Instead, the upward and downward facing cells are merely attached to the binding layers 412, 413, 414.

Figure 5:
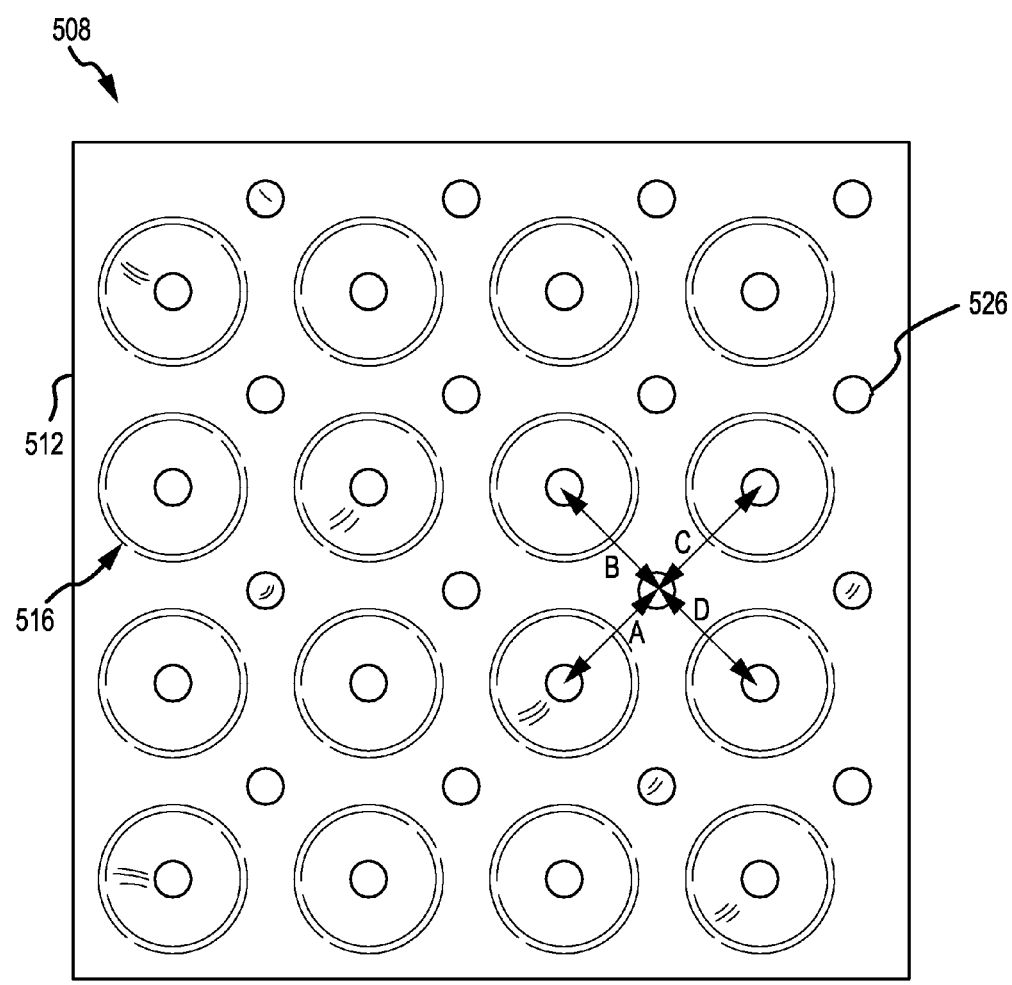
FIG. 5 illustrates a plan view of an example interdigitated cellular cushioning system.

FIG. 5 illustrates a plan view of an example interdigitated cellular cushioning system 508. The cushioning system 508 includes void cells (e.g., void cell 416) arranged in a matrix bounded by the top binding layer 412 and a bottom binding layer (not shown). The cells alternate facing upwards and downward. In one implementation, each upward facing cell (e.g., cell 516) is surrounded by downward facing cells and each downward facing cell (not shown) is surrounded by upward facing cells. The void cells are hollow chambers that resist deflection due to compressive forces, similar to compression springs. The force-deflection profile of the matrix of void cells is configurable based on the intended application of the cushioning system 508.

Each upward facing cell is a protrusion of the top binding layer 512 and each downward facing cell is a protrusion of the bottom binding layer. Each peak of the upward facing cells is attached to the bottom binding layer. Similarly, each peak of the downward facing cells is attached to the top binding layer 512 (see e.g., at attachment point or area 526). The binding layers link the void cells together forming the interdigitated cellular cushioning system 508. In other implementations, the upward and downward facing cells are not protrusions of the top and bottom binding layers. Instead, the upward and downward facing cells are merely attached to the top and bottom binding layers.

In some implementations, the distances between the attachment points on a binding layer (e.g., binding layer 512) and the centers of the open cells on the same binding layer are equidistant (i.e., distances A=B=C=D). This creates equal spacing between the void cells in the cushioning system 508. This may apply to one or both of the binding layers. Further, this equal spacing provides a consistent force-deflection profile of the matrix of void cells across the surface area of the binding layers.

Figure 6:
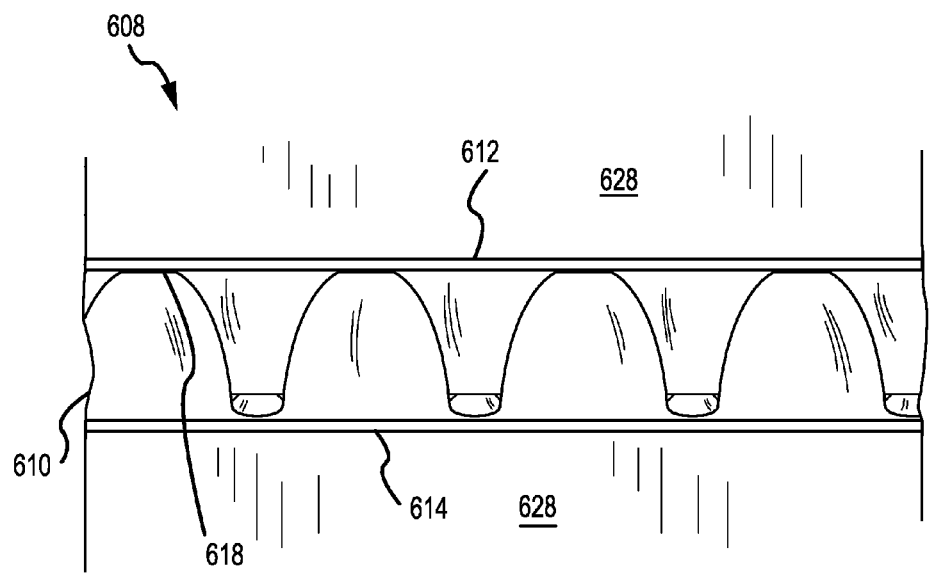
FIG. 6 illustrates an elevation view of an example interdigitated cellular cushioning system in an unloaded state.

FIG. 6 illustrates an elevation view of an example interdigitated cellular cushioning system 608 in an unloaded state. The cushioning system 608 includes void cells (e.g., void cell 610) arranged in a matrix bounded by a top binding layer 612 and a bottom binding layer 614. The cells alternate facing upwards and downward. Each peak of the upward facing cells is attached to the bottom binding layer 614. Similarly, each peak (e.g., peak 618) of the downward facing cells is attached to the top binding layer 612. The binding layers 612, 614 link the void cells together forming the interdigitated cellular cushioning system 608.

The cushioning system 608 is placed in a test apparatus 628 that is configured to simulate a variety of loads that may be placed on the cushioning system 608. The cushioning system 608 is not under load by the test apparatus 628. As a result, the top binding layer 612 and bottom binding layer 614 may not be entirely flat and the void cells are not yet engaged to provide resistance to compression of the cushioning system 608. Further, dimples (not shown) in the top binding layer 612 and/or bottom binding layer 614 may be present where void cells protruding from the opposite binding layer are attached to the top binding layer 612 and/or bottom binding layer 614 when the cushioning system 608 is not under load. The aforementioned features of the cushioning system 608 not under load may be intentionally designed into the cushioning system 608 or may be an artifact of the manufacturing process. Further, the magnitude of these features may vary.

Figure 7:
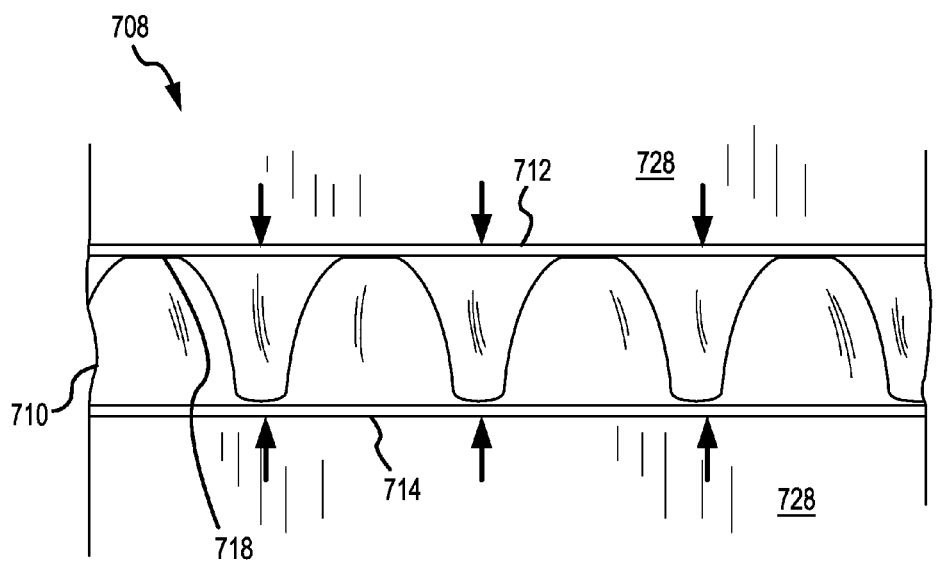
FIG. 7 illustrates an elevation view of an example interdigitated cellular cushioning system loaded in a first load range.

FIG. 7 illustrates an elevation view of an example interdigitated cellular cushioning system 708 loaded in a first load range. The cushioning system 708 includes void cells (e.g., void cell 710) arranged in a matrix bounded by a top binding layer 712 and a bottom binding layer 714. The cells alternate facing upwards and downward. Each peak of the upward facing cells is attached to the bottom binding layer 714. Similarly, each peak (e.g., peak 718) of the downward facing cells is attached to the top binding layer 712. The binding layers 712, 714 link the void cells together forming the interdigitated cellular cushioning system 708.

The cushioning system 708 is placed in a test apparatus 728 that is configured to simulate a variety of loads that may be placed on the cushioning system 708. A distributed load within the first load range (see FIG. 11, region 1) is applied to the cushioning system 708 by the test apparatus 728 as illustrated by the opposed arrows. As a result, the top binding layer 712 and bottom binding layer 714 are flattened and any dimples are flattened. Further, the void cells are engaged and resisting the load within the first load range with relatively little deformation.

Figure 8:
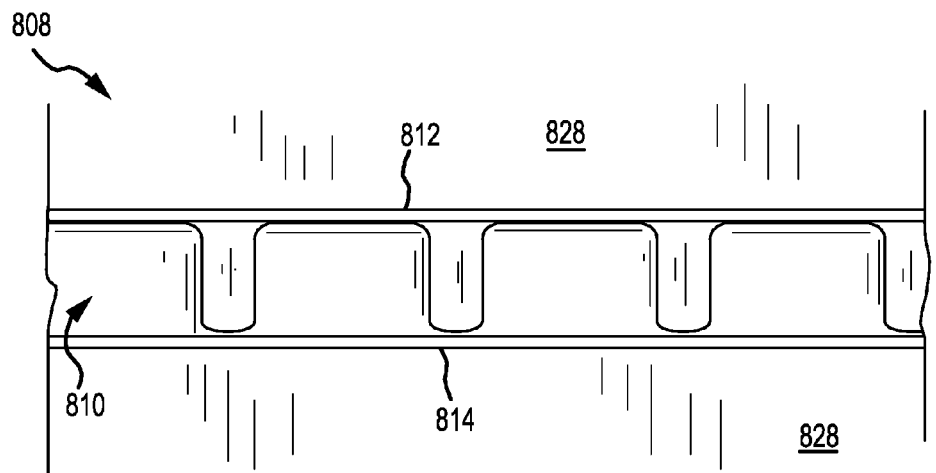
FIG. 8 illustrates an elevation view of an example interdigitated cellular cushioning system loaded in a second load range.

FIG. 8 illustrates an elevation view of an example interdigitated cellular cushioning system 808 loaded in a second load range. The cushioning system 808 includes void cells (e.g., void cell 810) arranged in a matrix bounded by a top binding layer 812 and a bottom binding layer 814. The cells alternate facing upwards and downward. Each of the upward facing cells is attached to the bottom binding layer 814. Similarly, each of the downward facing cells is attached to the top binding layer 812. The binding layers 812, 814 link the void cells together forming the interdigitated cellular cushioning system 808.

The cushioning system 808 is placed in a test apparatus 828 that is configured to simulate a variety of loads that may be placed on the cushioning system 808. A load within the second load range (see FIG. 11, region 2) is applied to the cushioning system 808 by the test apparatus 828. As a result, peaks (e.g., peak 718 of FIG. 7) of each of the void cells are flattened and the side walls of each of the void cells are reoriented vertically. In other implementations, the side walls are not reoriented vertically. However, the void cells are engaged and resisting the load within the second load range with flattening of the peaks of each of the void cells, but substantially no buckling of the side walls of each of the void cells. A consequence of the deformation of each of the void cells is that the top binding layer 812 and/or the bottom binding layer 814 may begin buckling as well.

Figure 9:
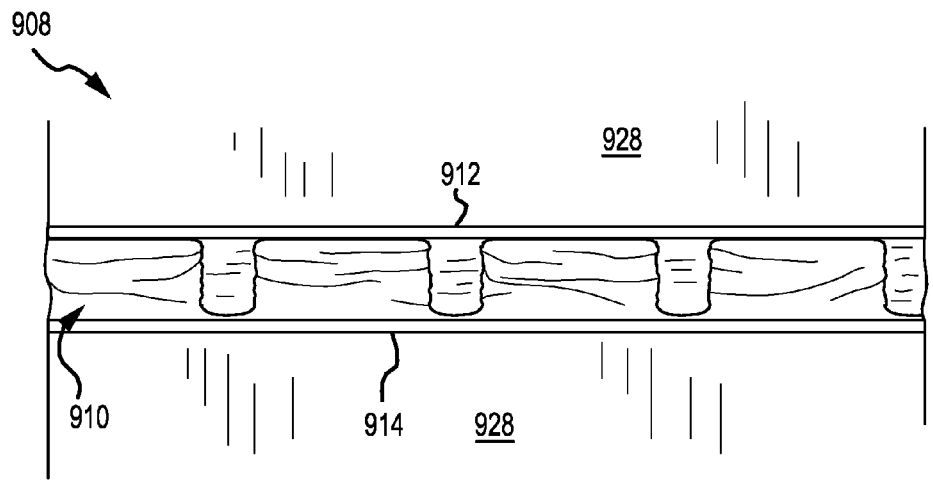
FIG. 9 illustrates an elevation view of an example interdigitated cellular cushioning system loaded in a third load range.

FIG. 9 illustrates an elevation view of an example interdigitated cellular cushioning system 908 loaded in a third load range. The cushioning system 908 includes void cells (e.g., void cell 910) arranged in a matrix bounded by a top binding layer 912 and a bottom binding layer 914. The cells alternate facing upwards and downward. Each of the upward facing cells is attached to the bottom binding layer 914. Similarly, each of the downward facing cells is attached to the top binding layer 912. The binding layers 912, 914 link the void cells together forming the interdigitated cellular cushioning system 908.

The cushioning system 908 is placed in a test apparatus 928 that is configured to simulate a variety of loads that may be placed on the cushioning system 908. A load within the third load range (see FIG. 11, region 3) is applied to the cushioning system 908 by the test apparatus 928. As a result, the side walls of each of the void cells are substantially buckling as compared to the side walls of each of the void cells depicted in FIG. 8. Further, the void cells are spaced far enough apart that the buckling side walls do not touch one another. In other implementations, the void cells may be spaced closer together and press against one another under certain loading conditions. If the buckling side walls touch one another during compression, the force required per unit of deflection generally increases. A consequence of the deformation of each of the void cells is that the top binding layer 912 and/or the bottom binding layer 914 may be buckling as well.

Figure 10:
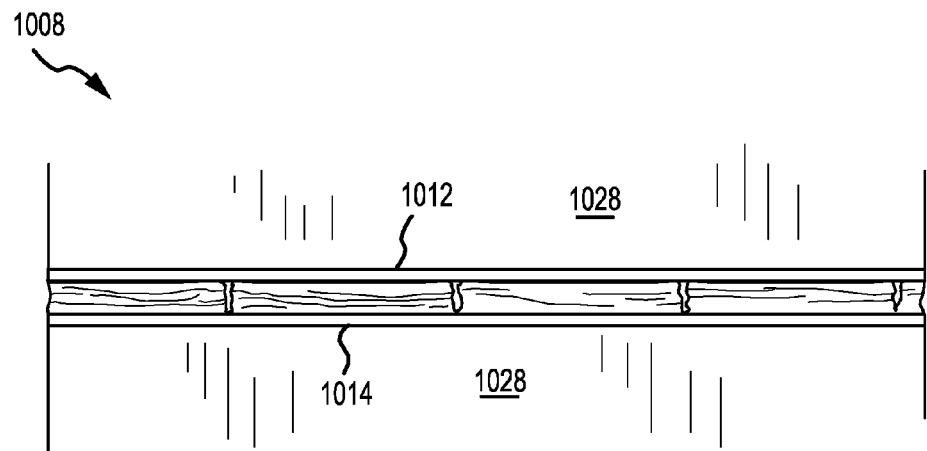
FIG. 10 illustrates an elevation view of an example interdigitated cellular cushioning system loaded in a fourth load range.

FIG. 10 illustrates an elevation view of an example interdigitated cellular cushioning system loaded in a fourth load range. The cushioning system 1008 includes void cells (no longer individually visible) arranged in a matrix bounded by a top binding layer 1012 and a bottom binding layer 1014. The cells alternate facing upwards and downward. Each of the upward facing cells is attached to the bottom binding layer 1014. Similarly, each of the downward facing cells is attached to the top binding layer 1012. The binding layers 1012, 1014 link the void cells together forming the interdigitated cellular cushioning system 1008.

The cushioning system 1008 is placed in a test apparatus 1028 that is configured to simulate a variety of loads that may be placed on the cushioning system 1008. A load within the fourth load range (see FIG. 11, region 4) is applied to the cushioning system 1008 by the test apparatus 1028. As a result, each of the void cells is fully compressed. Any further deformation of the cushioning system 1008 requires substantial increases in load. In one implementation, the fourth load range is referred to as densification.

Figure 11:
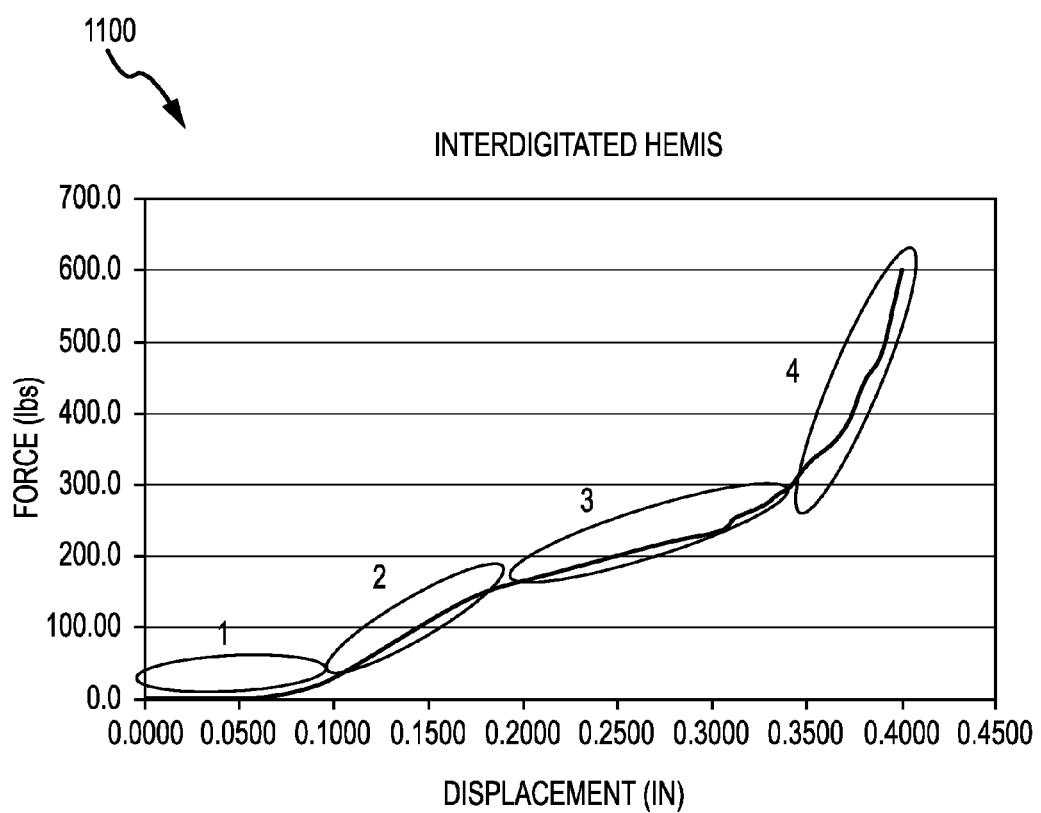
FIG. 11 illustrates an example force over displacement graph with four load ranges, each with unique spring rate characteristics.

FIG. 11 illustrates a force over displacement graph 1100 with four load ranges (1, 2, 3, & 4), each with unique spring rate characteristics. A force applied substantially perpendicular to a top binding layer and a bottom binding layer of an interdigitated cellular cushioning system is plotted on the vertical axis of the graph 1100. A displacement (or compressed distance) of the cushioning system is plotted on the horizontal axis of the graph 1100. A spring rate refers to the ratio between the force (or load) applied to the cushioning system to the compressive displacement of the cushioning system. The force over displacement graph 1100 is merely one example of the presently disclosed technology. Various features of the cushioning systems discussed herein may be modified to yield a force over displacement graph 1100 with desired characteristics for a specific application.

In a first load region (illustrated by oval 1 on graph 1100), relatively little force (i.e., 0 to 25 lbs.) is required to cause deformation of the cushioning system from 0 to 0.1 inches. This range is indicative of a load flattening the top binding layer and the bottom binding layer of the cushioning system and engaging all of the void cells in the cushioning system. For example, this load region is illustrated by FIG. 6 (approximately 0 lbs. load, and 0 inches displacement) and FIG. 7 (approximately 25 lbs. load and 0.1 inches displacement).

In a second load region (illustrated by oval 2 on graph 1100), more force (i.e., 25 to 175 lbs.) per unit displacement is required to cause deformation of the cushioning system from 0.1 to 0.2 inches. This range is indicative of all of the void cells in the cushioning system being engaged and collapse of the peaks of each of the void cells. Further, the side walls of each of the void cells, which would normally taper inward slightly when uncollapsed begin to be deflected to an orientation generally perpendicular to the load. In other implementations, the side walls of each of the void cells are not necessarily substantially deflected, even under load. For example, this load region is illustrated by FIG. 8.

In a third load region (illustrated by oval 3 on graph 1100), less force per unit displacement than region 2 but more force per unit displacement than region 1 (i.e., 175 to 300 lbs.) is required to cause deformation of the cushioning system from 0.2 to 0.35 inches. This range is indicative of the void cells buckling and collapsing in the cushioning system. For example, this load region is illustrated by FIG. 9.

In a fourth load region (illustrated by oval 4 on graph 1100), an exponentially increasing force per unit displacement (i.e., 300 to 600 lbs.) is required to cause deformation of the cushioning system from 0.35 to 0.4 inches. This range is indicative of complete compression of the cushioning system and compression of the cushioning system materials themselves. In one implementation, the fourth load range is referred to as densification. For example, this load region is illustrated by FIG. 10.

One feature of the force over displacement graph 1100 is that the force required to compress the interdigitated cellular cushioning system increases throughout the range of compressed displacement. This is referred to herein as a monotonically increasing force-deflection curve. Further, an interdigitated cellular cushioning system with a monotonically increasing force-deflection curve provides monotonically collapsing void cells.

Figure 12:
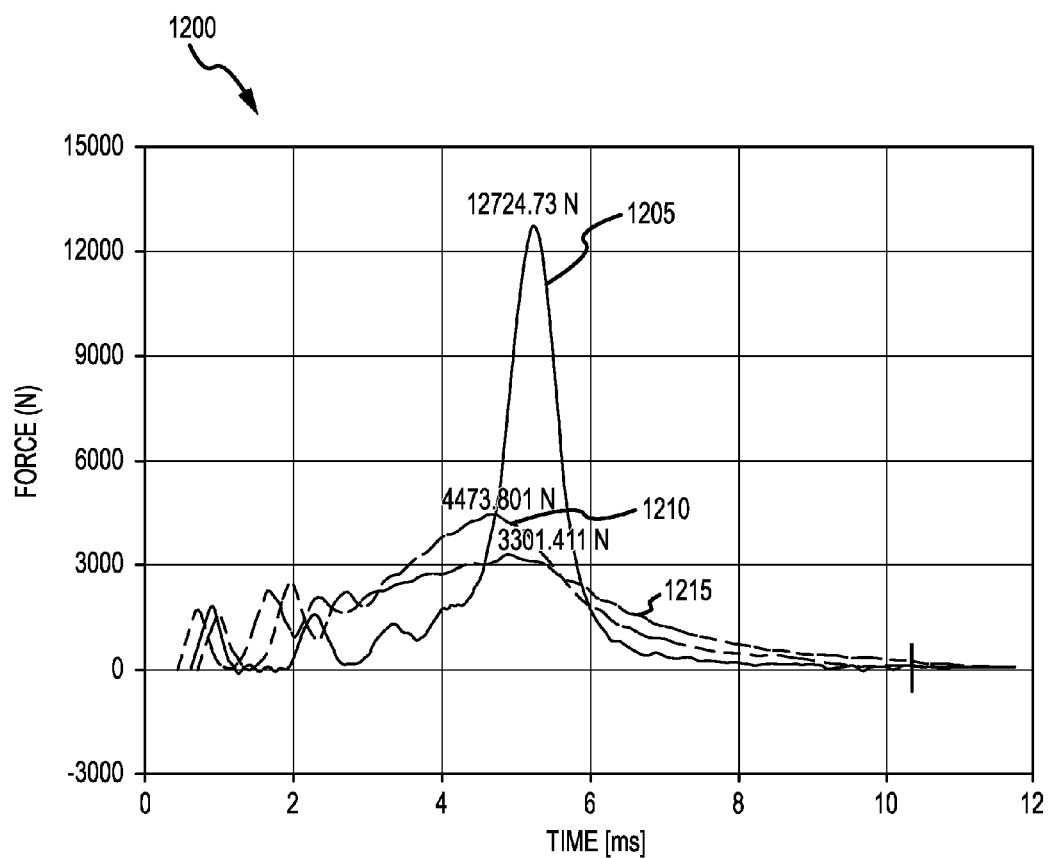
FIG. 12 illustrates a first example force over time graph comparing impact performance of an interdigitated cellular cushioning system with impact performance of opposed void cellular cushioning systems.

FIG. 12 illustrates a first example force over time graph 1200 comparing impact performance of an interdigitated cellular cushioning system with impact performance of opposed void cellular cushioning systems. The graph 1200 illustrates an example impact applied substantially perpendicular to the binding layers of the various cushioning systems with a 2.355 kilogram (kg) mass moving at 5 meters per second (m/s). The force in Newtons (N) transmitted through the cushioning systems is illustrated on the vertical y-axis of the graph 1200 and the duration of time in milliseconds (ms) of the impact is illustrated on the horizontal x-axis of the graph 1200. The example impact occurs within approximately 10.5 ms for each of the cushioning systems.

Solid line 1205 illustrates an example single-layer opposed void cushioning system utilizing a singular layer of opposed hemiellipsoidal voids, wherein each of the hemiellipsoidal voids are joined together at their peaks and the hemiellipsoidal voids are bound together by top and bottom binding layers. The example single-layer opposed void cushioning system is 0.75 inches (in) thick in this implementation. Solid line 1205 illustrates that the example single-layer opposed void cushioning system absorbs the least force of the illustrated example cushioning systems with a peak transmitted load of 12,724.73 N, which is concentrated between approximately 4.5 ms and 6 ms.

Dashed line 1210 illustrates an example double-layer opposed void cushioning system utilizing two layers of opposed hemiellipsoidal voids. Within each layer are hemiellipsoidal voids joined together at their peaks and bound together by top and bottom binding layers. The two layers are then stacked and joined together to form the double-layer opposed void cushioning system. The example double-layer opposed void cushioning system is 0.75 in thick in this implementation (i.e., each of the two layers is 0.375 in thick). Dashed line 1210 illustrates that the example double-layer opposed void cushioning system absorbs more force than the single-layer opposed void cushioning system with a peak transmitted load of 4,473.801 N, which is concentrated between approximately 3 ms and 6 ms.

Dotted line 1215 illustrates an example double-layer interdigitated void cushioning system utilizing two layers of interdigitated hemiellipsoidal voids. Each layer includes void cells arranged in a matrix bounded by a top binding layer and a bottom binding layer (See e.g., FIGS. 2, 3). The cells alternate facing upwards and downward. Each of the upward facing cells is attached to the bottom binding layer. Similarly, each of the downward facing cells is attached to the top binding layer. The binding layers link the void cells together forming a cushioning system layer. The two layers are then stacked and joined together to form the double-layer interdigitated void cushioning system (see e.g., FIG. 4). The example double-layer interdigitated void cushioning system is 0.75 in thick in this implementation (i.e., 0.375 in thick for each layer). Dotted line 1215 illustrates that the example double-layer interdigitated void cushioning system absorbs more force than both the single-layer opposed void cushioning system and the double-layer opposed void cushioning system with a peak transmitted load of 3,301.411 N, which is concentrated between approximately 3 ms and 6 ms.

In summary, the double-layer interdigitated void cushioning system illustrated by dotted line 1215 is particularly effective at absorbing kinetic energy and reducing the peak transmitted load caused by an impact. The double-layer interdigitated void cushioning system illustrated by dotted line 1215 is merely one example of the presently disclosed technology. Various features of the cushioning systems discussed herein may be modified to yield different force over time graphs with desired characteristics for different applications and expected loading conditions.

Figure 13:
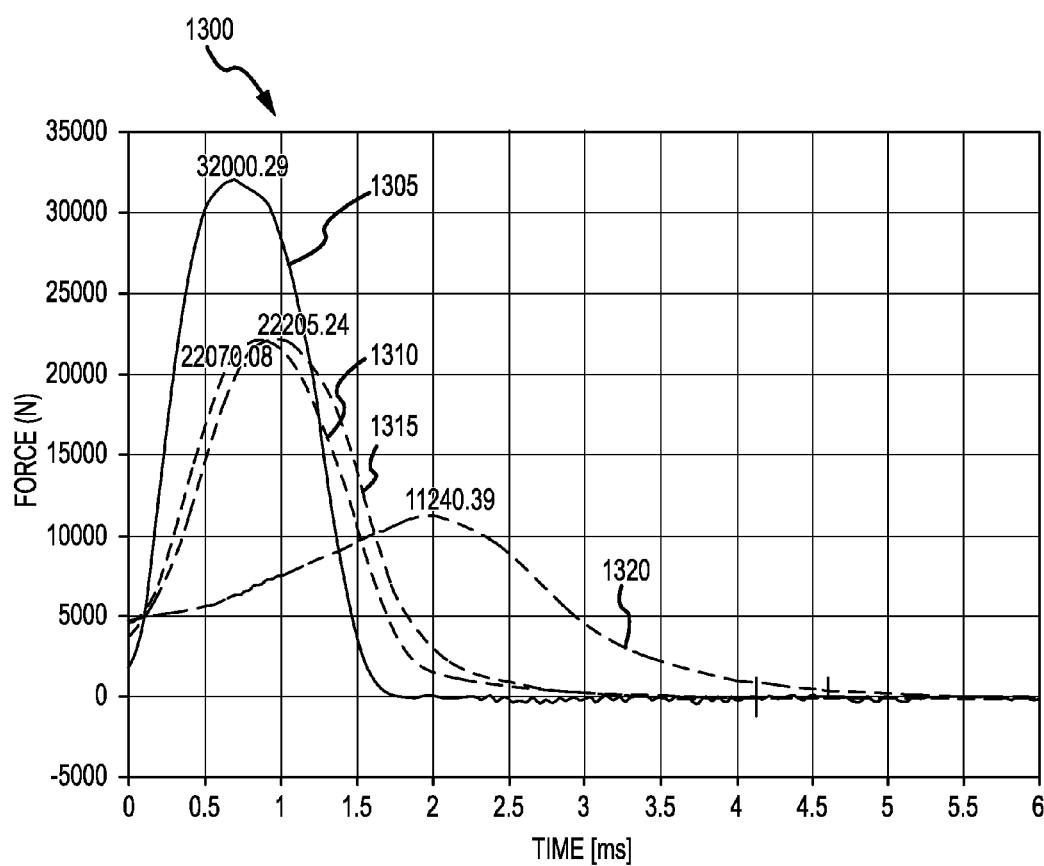
FIG. 13 illustrates a second example force over time graph comparing impact performance of two interdigitated cellular cushioning systems with impact performance of an opposed void cellular cushioning system.

FIG. 13 illustrates a second example force over time graph 1300 comparing impact performance of two interdigitated cellular cushioning systems with impact performance of an opposed void cellular cushioning system. The cushioning systems illustrated on graph 1300 are for a helmet application, although they could be used for other applications. The graph 1300 illustrates an example impact applied substantially perpendicular to the binding layers of the various cushioning systems with a 5.355 kg mass moving at 4.27 m/s. The force transmitted through the cushioning systems is illustrated on the vertical y-axis of the graph 1300 and the duration of time of the impact is illustrated on the horizontal x-axis of the graph 1300. The example impact occurs within approximately 4.5 ms for each of the cushioning systems and each of the cushioning systems has a similar thickness (e.g., 0.5-1.0 in).

Line 1305 illustrates an example helmet without a cushioning system. The example helmet without a cushioning system transmits the greatest amount of force with a peak transmitted load of 32,000.29 N, which is concentrated between approximately 0 ms and 1.75 ms.

Line 1310 illustrates an example single-layer opposed void helmet cushioning system utilizing a singular layer of opposed hemiellipsoidal voids, wherein each of the hemiellipsoidal voids are joined together at their peaks and the hemiellipsoidal voids are bound together by top and bottom binding layers. Line 1310 illustrates that the example single-layer opposed void helmet cushioning system absorbs significantly more force than the example helmet without a cushioning system with a peak transmitted load of 22,070.06 N, which is concentrated between approximately 0 ms and 2.5 ms.

Line 1315 illustrates an example single-layer interdigitated void helmet cushioning system utilizing void cells arranged in a matrix bounded by a top binding layer and a bottom binding layer (See e.g., FIGS. 2, 3). The cells alternate facing upwards and downward. Each of the upward facing cells is attached to the bottom binding layer. Similarly, each of the downward facing cells is attached to the top binding layer. The binding layers link the void cells together forming the single-layer interdigitated void helmet cushioning system. Line 1315 illustrates that the example single-layer interdigitated void helmet cushioning system absorbs a similar amount of force as the single-layer opposed void helmet cushioning system with a peak transmitted load of 22205.24 N, which is concentrated between approximately 0 ms and 2.5 ms.

Line 1320 illustrates an example double-layer interdigitated void helmet cushioning system utilizing two layers of interdigitated hemiellipsoidal voids. Each layer includes void cells arranged in a matrix bounded by a top binding layer and a bottom binding layer (see e.g., FIGS. 2, 3). The cells alternate facing upwards and downward. Each of the upward facing cells is attached to the bottom binding layer. Similarly, each of the downward facing cells is attached to the top binding layer. The binding layers link the void cells together forming a cushioning system layer. The two layers are then stacked and joined together to form the double-layer interdigitated void helmet cushioning system (see e.g., FIG. 4). Line 1320 illustrates that the example double-layer interdigitated void helmet cushioning system absorbs more force than both the single-layer opposed void helmet cushioning system illustrated by line 1310 and the single-layer interdigitated void helmet cushioning system illustrated by line 1315. The example double-layer interdigitated void helmet cushioning system has a peak transmitted load of 11.240.39 N, which is concentrated between approximately 0 ms and 3 ms.

In summary, the double-layer interdigitated helmet void cushioning system illustrated by line 1320 is particularly effective at absorbing kinetic energy and reducing the peak transmitted load caused by an impact. In helmet applications, this can reduce the occurrence of concussion injuries to individuals wearing so-equipped helmets. The double-layer interdigitated helmet void cushioning system illustrated by line 1320 is merely one example of the presently disclosed technology. Various features of the cushioning systems discussed herein may be modified to yield different force over time graphs with desired characteristics for different applications and expected loading conditions.

Figure 14:
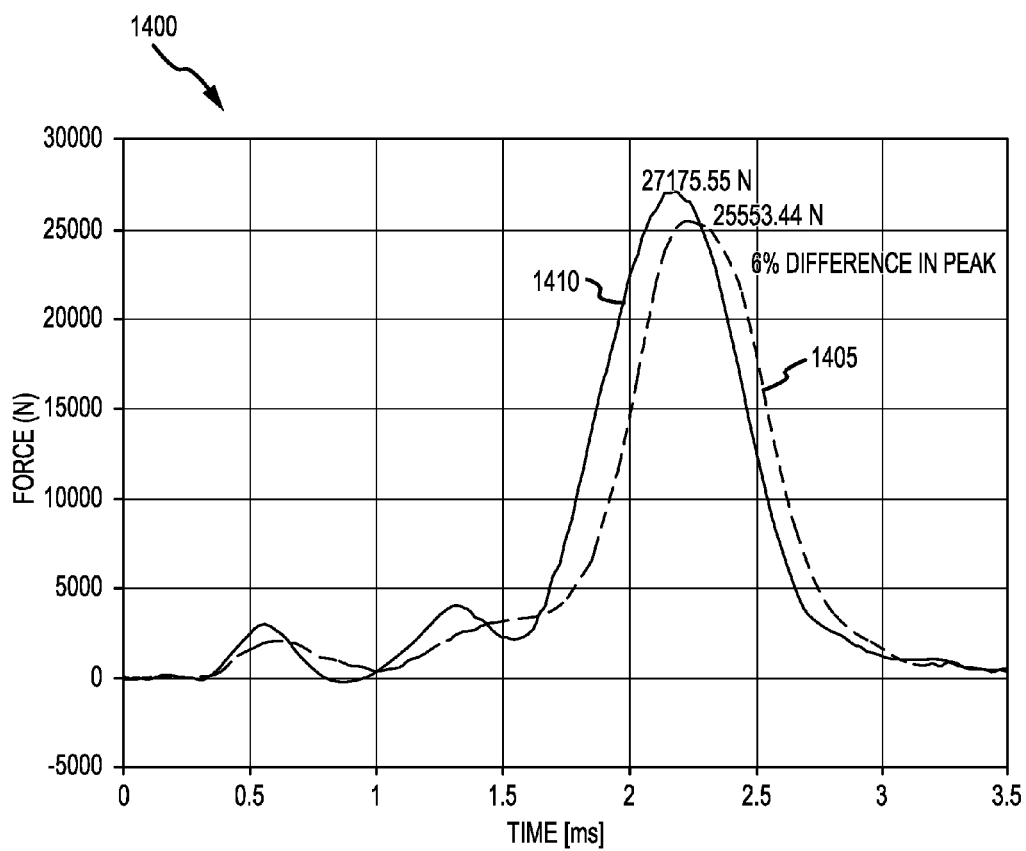
FIG. 14 illustrates a third example force over time graph comparing impact performance of an interdigitated cellular cushioning system with impact performance of an opposed void cellular cushioning system.

FIG. 14 illustrates a third example force over time graph 1400 comparing impact performance of an interdigitated cellular cushioning system with impact performance of an opposed void cellular cushioning system. The graph 1400 illustrates an example impact applied substantially perpendicular to the binding layers of the cushioning systems with a 2.355 kg mass moving at 7.0 m/s. The force transmitted through the cushioning systems is illustrated on the vertical y-axis of the graph 1400 and the duration of time of the impact is illustrated on the horizontal x-axis of the graph 1400. The example impact occurs between approximately 0.5 ms and 3.0 ms for each of the cushioning systems.

Line 1405 illustrates an example opposed void cushioning system utilizing a singular layer of opposed hemiellipsoidal voids, wherein each of the hemiellipsoidal voids are joined together at their peaks and the hemiellipsoidal voids are bound together by top and bottom binding layers. The opposed void cushioning system is approximately 0.75 in thick. Line 1405 illustrates that the example opposed void cushioning system has a peak transmitted load of 25,553.44 N, which is concentrated between approximately 1.75 ms and 3.0 ms.

Line 1410 illustrates an example interdigitated void cushioning system utilizing a singular layer of void cells arranged in a matrix bounded by a top binding layer and a bottom binding layer (see e.g., FIGS. 2, 3). The cells alternate facing upwards and downward. Each of the upward facing cells is attached to the bottom binding layer. Similarly, each of the downward facing cells is attached to the top binding layer. The binding layers link the void cells together forming the interdigitated void cushioning system. The interdigitated void cushioning system is approximately 0.325 in thick. Line 1410 illustrates that the example interdigitated void cushioning system transmits approximately 6% more force than the opposed void cushioning system with a peak transmitted load of 27,175.55 N, which is concentrated between approximately 1.75 ms and 3.0 ms.

In summary, the interdigitated void cushioning system illustrated by line 1410 is only approximately 6% less effective than the opposed void cushioning system at absorbing impact force while utilizing approximately 50% of the overall material thickness of the opposed void cushioning system. This makes the interdigitated void cushioning system particularly effective in space-limited areas. The interdigitated void cushioning system illustrated by line 1410 is merely one example of the presently disclosed technology. Various features of the cushioning systems discussed herein may be modified to yield a different force over time graphs with desired characteristics for different applications and expected loading conditions.

Figures 15A, 15B:
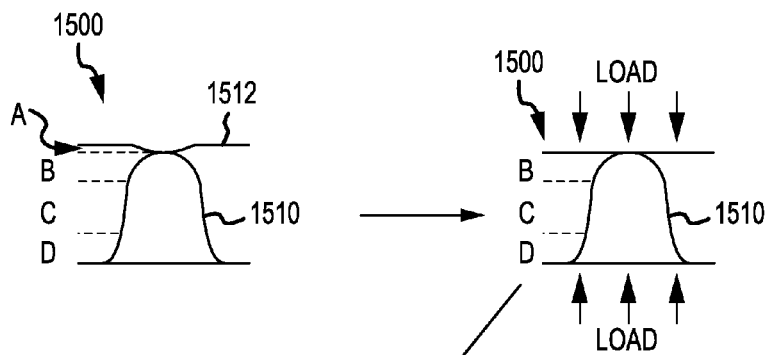
FIG. 15A illustrates an example uncompressed cell in an interdigitated cellular cushioning system.
FIG. 15B illustrates an example cell in an interdigitated cellular cushioning system compressed in a first load range.

FIG. 15A illustrates an example uncompressed cell 1510 in an interdigitated cellular cushioning system 1500. The cell 1510 is uncompressed and has four distinct regions. Region A is occupied by a dimple in a top binding layer 1512. The dimple may be designed as a part of the cushioning system 1500 or an artifact of the manufacturing process used to create the cushioning system 1500. Region B is occupied by the domed or peak portion of the cell 1510. Region C is occupied by the side-walls of the cell 1510 and Region D is occupied by the base of the cell 1510. In one implementation, FIG. 15A corresponds to FIG. 6 and FIG. 11 at 0 lbs of load and 0 in of displacement.

FIG. 15B illustrates an example cell 1510 in an interdigitated cellular cushioning system 1500 compressed in a first load range. Compression of the cell 1510 removes the dimple and region A, which was occupied by the dimple in FIG. 15A. The cell 1510 is under load but has not substantially deflected from its shape in FIG. 15A. As a result, regions B, C, and D are relatively unchanged with respect to FIG. 15A. In one implementation, FIG. 15B corresponds to FIG. 7 and FIG. 11, load region 1.

Figures 15C, 15D, 15E:
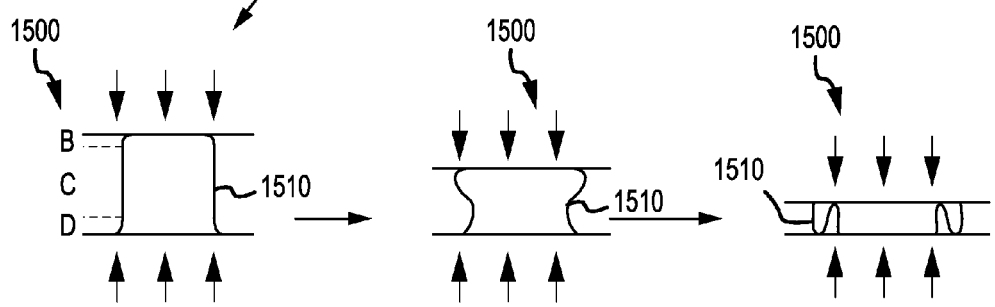
FIG. 15C illustrates an example cell in an interdigitated cellular cushioning system compressed in a second load range.
FIG. 15D illustrates an example cell in an interdigitated cellular cushioning system compressed in a third load range.
FIG. 15E illustrates an example cell in an interdigitated cellular cushioning system compressed in a fourth load range.

FIG. 15C illustrates an example cell 1510 in an interdigitated cellular cushioning system 1500 compressed in a second load range. Further compression of the cell 1510 changes the shape of the cell 1510. The domed or peak portion of the cell 1510 illustrated in FIGS. 15A and 15B is mostly, if not completely, collapsed. Thus, region B is reduced to nearly zero vertical dimension. Further, the base of the cell 1510 is compressed and also reduced in size. Region C grows to encompass most of the height of the cell 1510 as compared to FIGS. 15A and 15B. In one implementation, FIG. 15C corresponds to FIG. 8 and FIG. 11, load region 2.

FIG. 15D illustrates an example cell 1510 in an interdigitated cellular cushioning system 1500 compressed in a third load range. Further compression of the cell 1510 buckles the side-walls of the cell 1510. The cell 1510 collapses as the side-walls of the cell 1510 collapse further. In one implementation, FIG. 15D corresponds to FIG. 9 and FIG. 11, load region 3.

FIG. 15E illustrates an example cell 1510 in an interdigitated cellular cushioning system 1500 compressed in a fourth load range. Further compression of the cell 1510 fully buckles the side-walls and fully collapses of the cell 1510. Any further compression of the cell 1510 is due to compression of the material used to construct the cell (referred to as densification herein). In one implementation, FIG. 15E corresponds to FIG. 10 and FIG. 11, load region 4.

Figure 16:
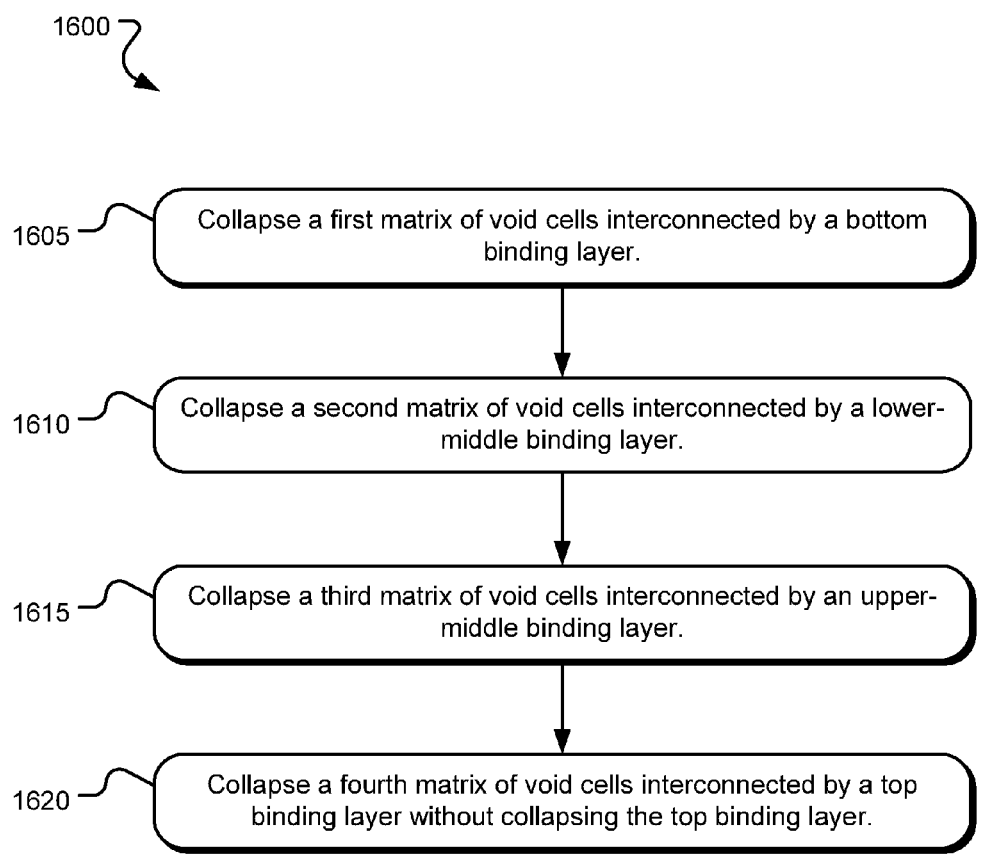
FIG. 16 illustrates example operations for using an interdigitated cellular cushioning system.

FIG. 16 illustrates example operations 1600 for using an interdigitated cellular cushioning system. A first collapsing operation 1605 collapses a first matrix of void cells interconnected by a bottom binding layer. The first collapsing operation 1605 may occur as a result of an impact or explosion adjacent the bottom binding layer that applies substantial kinetic energy to the bottom binding layer. The collapse of the first matrix of void cell absorbs some of the kinetic energy applied to the bottom binding layer. A second collapsing operation 1610 collapses a second matrix of void cells interdigitated with the first matrix of void cells and interconnected by a lower-middle binding layer. The collapse of the second matrix of void cell absorbs more of the kinetic energy caused by the impact or explosion, for example.

A third collapsing operation 1615 collapses a third matrix of void cells interconnected by an upper-middle binding layer. The third collapsing operation 1615 may occur as a result of energy from the impact or explosion traveling through the collapsed first and second matrices of void cells to the third matrix of void cells. The collapse of the third matrix of void cell absorbs more of the kinetic energy caused by the impact or explosion, for example. A fourth collapsing operation 1620 collapses a fourth matrix of void cells interdigitated with the third matrix of void cells and interconnected with a top binding layer without collapsing the top binding layer. The first, second, third, and fourth matrices of void cells and the bottom, lower-middle, upper-middle, and top binding layers in combination form the interdigitated cellular cushioning system. The collapse of the fourth matrix of void cell absorbs more of the kinetic energy caused by the impact or explosion, for example.

If sufficient energy is absorbed by the collapse of the first, second, third, and fourth matrices of void cells, the top binding layer is not collapsed. This protects personnel and/or equipment adjacent the top binding layer. In other implementations, the top binding layer is partially collapsed, but less so than the bottom, lower-middle, and upper-middle binding layers, partially protecting the personnel and/or equipment adjacent the top binding layer. In some implementations, only two (rather than four) matrices of void cells are used to form the interdigitated cellular cushioning system. In other implementations, greater than four matrices of void cells are used to form the interdigitated cellular cushioning system.

For example, the interdigitated cellular cushioning system may absorb an explosion that deflects a layer of armor on one side of the interdigitated cellular cushioning system without deflecting a flooring layer on the opposite side of the interdigitated cellular cushioning system. The cellular cushioning system may act to absorb energy of the explosion so that the flooring does not transfer the energy to users standing on the floor.

Figure 17:
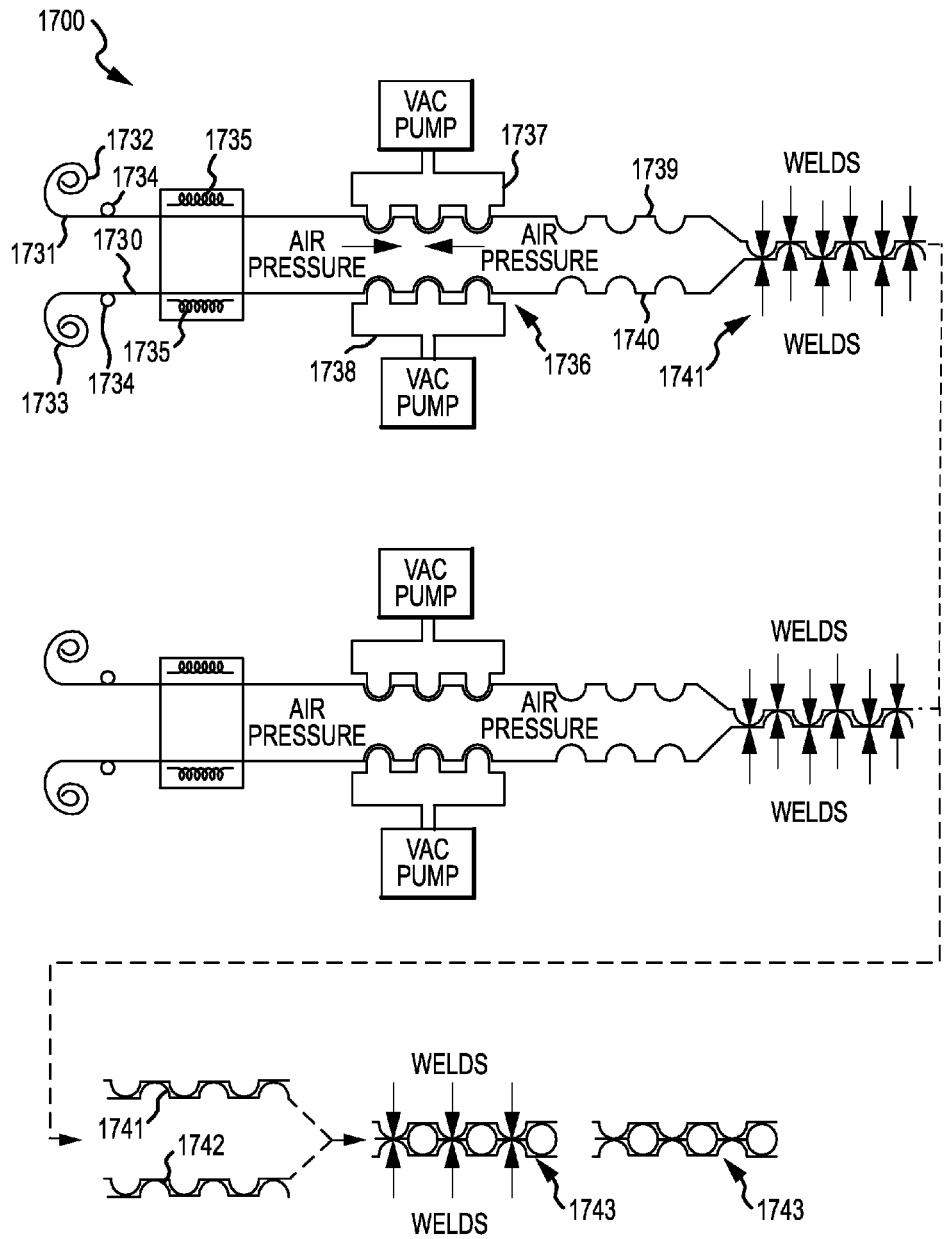
FIG. 17 illustrates an example thermoforming manufacturing process for making a 2-layer interdigitated cellular cushioning system.

FIG. 17 illustrates an example thermoforming manufacturing process 1700 for making a 2-layer interdigitated cellular cushioning system 1743. Two rolls of thermoplastic sheet stock 1730, 1731 are fed from rolls 1732, 1733 over rollers 1734 to sheet stock heaters 1735 to raise the temperature of the sheet stock to substantially its normal forming temperature. The sheet stock 1730, 1731 is then advanced to a form station 1736 with an upper mold 1737 and a lower mold 1738. Vacuum is applied to the molds 1737, 1738 to force the upper sheet material 1731 into the upper mold 1737 and the lower sheet material 1730 into the lower mold 1738. Air pressure may also be applied between the sheets to assist in forcing the thermoplastic sheet stock 1730, 1731 firmly into the molds 1737, 1738. Formed sheets 1739, 1740 of thermoplastic with hemiellipsoidal protrusions are removed from the molds 1737, 1738 and joined together by orienting the hemiellipsoidal protrusions between one another and welding the peaks of each of the hemiellipsoidal protrusions to the opposite sheet of thermoplastic material. The resulting material is a first layer of interdigitated cellular cushioning 1741.

A second layer of interdigitated cellular cushioning 1742 is manufactured in a similar process as discussed above with regard to the first layer of interdigitated cellular cushioning 1741. In some implementations, the formed sheets are merely placed in the aforementioned position without welding. The formed sheets are held in place by the additional welds discussed below. However, in this implementation, only the hemiellipsoidal protrusions of the first layer of interdigitated cellular cushioning that meet the second layer of interdigitated cellular cushioning, and vice versa, are welded.

The second layer of interdigitated cellular cushioning 1742 may be manufactured simultaneously using additional equipment as depicted in FIG. 17 or manufactured sequentially after the first layer of interdigitated cellular cushioning 1741 using the same equipment as the first layer of interdigitated cellular cushioning 1741. Further, one mold may be used to sequentially manufacture the formed sheets 1739, 1740 of thermoplastic rather than the depicted two molds 1737, 1738 manufacturing the formed sheets 1739, 1740 simultaneously. In another implementation, separate sheets of thermoplastic may be used instead of the depicted continuous rolls of thermoplastic sheet stock. The sheets move from station to station (e.g., from heating to molding) in such a process.

The first layer of interdigitated cellular cushioning 1741 and the second layer of interdigitated cellular cushioning 1742 are placed adjacent one another with peaks of hemiellipsoidal protrusions on each of the cellular cushioning layers 1741, 1742 aligned. The cellular cushioning layers 1741, 1742 are joined by welding at peaks of the hemiellipsoidal protrusions where the four layers of thermoplastic material meet. The resulting material is the 2-layer interdigitated cellular cushioning system 1743. In some implementations, additional layers of interdigitated cellular cushioning or other materials may be applied to the interdigitated cellular cushioning system 1743 to give the system 1743 different features.

As described, each of the cellular cushioning layers 1741, 1742 and/or formed sheets 1739, 1740 of thermoplastic with hemiellipsoidal protrusions can be constructed of different thermoplastic materials. Accordingly, the features of the interdigitated cellular cushioning system 1743 may be tuned for specific applications. For example, the layer 1741 may be composed of a thicker, heavier thermoplastic material, while the layer 1742 may be composed of a thinner, lighter thermoplastic material. Similarly, the sheet 1739 may be composed of a thicker, heavier thermoplastic material, while the sheet 1740 may be composed of a thinner, lighter thermoplastic material. Having corresponding cellular cushioning layers 1741, 1742 and/or formed sheets 1739, 1740 of different materials increases the ability of the designer to construct differing degrees of flexibility or resistance into specific areas of the system 1743. By varying the materials employed in terms of specific properties such as tensile strength, material thickness, and elongation and by varying the hemiellipsoidal protrusion dimensions, a number of consistently reproducible regions of desired resistance and flexibility can be engineered into the system 1743 to meet specific requirements.

Figure 18:
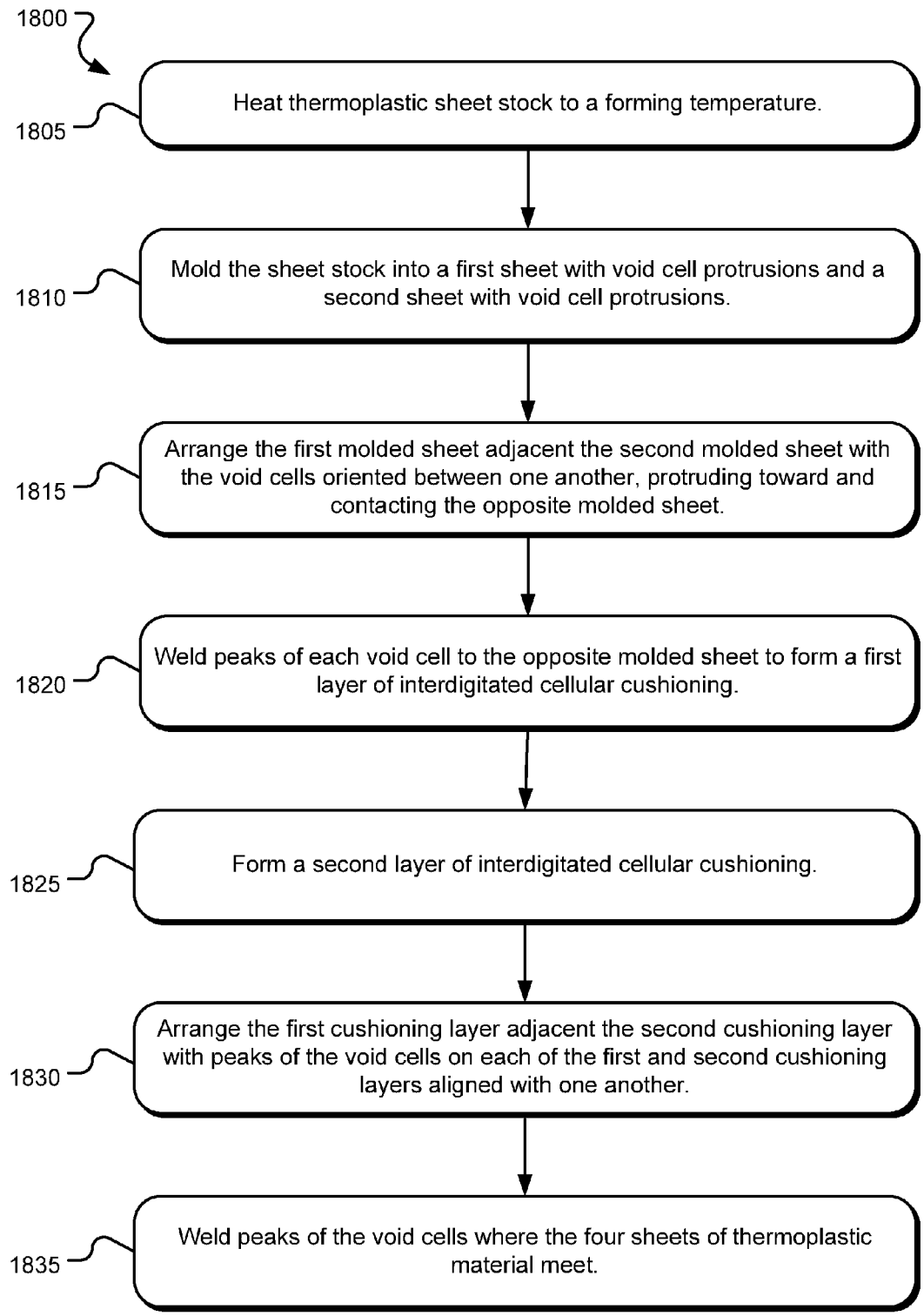
FIG. 18 illustrates example operations for manufacturing an interdigitated cellular cushioning system.

FIG. 18 illustrates example operations 1800 for manufacturing an interdigitated cellular cushioning system. A heating operation 1805 heats thermoplastic sheet stock to a forming temperature. The thermoplastic sheet stock may be a continuation roll or discrete sheets of material. A molding operation 1810 molds the sheet stock into a first sheet with void cell protrusions and a second sheet with void cell protrusions. The molding operation 1810 may utilize one mold to form the first sheet and the second sheet sequentially or two molds to form the first sheet and the second sheet simultaneously. The void cell protrusions may have a variety of shapes (e.g., hemiellipsoidal), sizes, and spacings. Further, the molding operation 1810 may utilize one or both of positive and negative pressures to aid the sheets in conforming to the mold(s).

An arranging operation 1815 arranges the first molded sheet adjacent the second molded sheet with the void cells oriented between one another, protruding toward and contacting the opposite molded sheet (referred to herein as interdigitation). A welding operation 1820 welds peaks of each of the void cells to the opposite molded sheet to form a first layer of interdigitated cellular cushioning. In one implementation, the welding operation 1820 is accomplished by bringing a hot iron from above and a corresponding hot iron or other structure from below and providing sufficient thermal energy and pressure from the hot iron(s) to melt and coalesce the molded sheets together at the point of the contact with the hot iron(s). In some implementations, the welding operation 1820 is optional as welding operation 1835 alone may sufficiently join the molded sheets together.

A forming operation 1825 forms a second layer of interdigitated cellular cushioning. The forming operation 1825 may be accomplished by repeating operations 1805-1820, for example. An arranging operation 1830 arranges the first cushioning layer adjacent the second cushioning layer with peaks of the void cells on each of the first and second cushioning layers aligned with one another. As a result, the four sheets of thermoplastic material are adjacent one another at the peaks of the outwardly facing void cells. The welding operation 1835 welds peaks of the void cells where the four sheets of thermoplastic material meet. The welding operation 1835 may be accomplished as discussed above with regard to the welding operation 1820. As a result, the four sheets of thermoplastic material are melted and coalesced together at the weld points and the resulting structure is a 2-layer interdigitated cellular cushioning system. In some implementations, additional layers of interdigitated cellular cushioning or other materials may be added to the interdigitated cellular cushioning system to achieve desired properties of the interdigitated cellular cushioning system. In some implementations, the additional layers may include a floor for users to stand upon and/or armor to protect users from impact by various projectiles.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. An interdigitated cellular cushioning system comprising:
    a first sheet of thermoplastic elastomer material defining a first binding layer having a top surface and a bottom surface, each of the top surface and the bottom surface being either planar or curved, and a first array of void cells contiguous with and protruding from the first binding layer, each void cell in the first array extending from the top surface and having a base integral with the binding layer, a wall, and a peak; and
    a second sheet of thermoplastic elastomer material defining a second binding layer having a top surface and a bottom surface, each of the top surface and the bottom surface being either planar or curved, and a second array of void cells contiguous with and protruding from the second binding layer, each void cell in the second array extending from the top surface and having a base integral with the second binding layer, a wall, and a peak,
    wherein the walls of the void cells in the first array are distinct from and non-contactingly spaced from the walls of the void cells in the second array, and wherein the peaks of the void cells in the first array are welded to the top surface of the second binding layer at first attachment points and the peaks of the void cells in the second array are welded to the top surface of the first binding layer at second attachment points, and
    wherein the void cells in the first array and the void cells in the second array are configured to collapse under a load and return to an uncollapsed state when the load is removed.

2. The interdigitated cellular cushioning system of claim 1, wherein the void cells in the first array and the void cells in the second array have a hollow interior volume.

3. The interdigitated cellular cushioning system of claim 1, wherein the void cells in the first array and the void cells in the second array have one or more of a hemiellipsoidal, cubic, hemispherical, conical, truncated conical, and pyramidal shape.

4. The interdigitated cellular cushioning system of claim 1, wherein the first attachment points surrounding a base of a void cell in the second array are equidistant, and the second attachment points surrounding a base of a void cell in the first array are equidistant.

5. The interdigitated cellular cushioning system of claim 1, wherein at least one of the first binding layer and the second binding layer is configured to conform to a curved surface.

6. The interdigitated cellular cushioning system of claim 1, wherein the void cells in the first array and the void cells in the second array do not rely on air pressure to provide resistance to deflection.

7. The interdigitated cellular cushioning system of claim 1 configured to be installed within a helmet.

8. The interdigitated cellular cushioning system of claim 1, wherein the void cells in the first array and the void cells in the second array are configured to monotonically collapse under a load.

9. An interdigitated cellular cushioning system comprising:
    a first planar thermoplastic elastomer binding layer;
    a second planar thermoplastic elastomer binding layer;
    a first array of truncated conical void cells, the void cells in the first array having a peak, a wall, and a base, the base of the void cells connected to the first binding layer and the peak of the void cells in the first array welded to the second binding layer at a first planar attachment point, with each base creating a discontinuity in the first binding layer; and
    a second array of truncated conical void cells, the void cells in the second array having a peak, a wall, and a base, the base of the void cells connected to the second binding layer and the peak of the void cells in the second array welded to the first binding layer at a second planar attachment point, with each base creating a discontinuity in the second binding layer, wherein the walls of the void cells in the first array are distinct from and non-contactingly spaced from the walls of the void cells in the second array,
    wherein the void cells in the first array and the void cells in the second array are configured to collapse under a load without fracturing.

10. The interdigitated cellular cushioning system of claim 9, wherein the void cells in the first array and the void cells in the second array have a hollow interior volume.

11. The interdigitated cellular cushioning system of claim 9, wherein the first attachment points surrounding a base of a void cell in the second array are equidistant, and the second attachment points surrounding a base of a void cell in the first array are equidistant.

12. The interdigitated cellular cushioning system of claim 9, wherein at least one of the first binding layer and the second binding layer is configured to conform to a curved surface.

13. The interdigitated cellular cushioning system of claim 9 configured to be installed within a helmet.

14. The interdigitated cellular cushioning system of claim 9, wherein the void cells in the first array and the void cells in the second array are configured to monotonically collapse under a load.

15. A method of manufacturing an interdigitated cellular cushioning system comprising:
    molding a first sheet of thermoplastic elastomer material into a first binding layer with a first array of void cells protruding from the first binding layer, each void cell having a base integral with the first binding layer and a peak;
    molding a second sheet of thermoplastic elastomer material separate from the first sheet into a second binding layer with a second array of void cells protruding from the second binding layer, each void cell having a base integral with the second binding layer and a peak;

interleaving the first array of void cells with the second array of void cells so that the peaks of the first array of void cells are proximate the second binding layer and the peaks of the second array of void cells are proximate the first binding layer and so that the void cells of the first array do not contact the void cells of the second array;

attaching the peaks of the void cells in the first array to a planar attachment point on the second binding layer; and attaching the peaks of the void cells in the second array to a planar attachment point on the first binding layer.

16. The method of manufacturing the interdigitated cellular cushioning system of claim 15, wherein the interdigitated cellular cushioning system is configured to be installed within a helmet.

17. The method of manufacturing the interdigitated cellular cushioning system of claim 15, wherein the void cells in the first array and the void cells in the second array are configured to monotonically collapse under a load.

\* \* \* \* \*